United States Patent
Lee et al.

(10) Patent No.: US 7,234,638 B2
(45) Date of Patent: Jun. 26, 2007

(54) METHOD AND APPARATUS FOR PERFORMING BENEFIT TRANSACTIONS USING A PORTABLE INTEGRATED CIRCUIT DEVICE

(75) Inventors: Bradley Lee, Plano, TX (US); James Charles Wilson, Plano, TX (US)

(73) Assignee: Hitachi America, Ltd., Brisbane, CA (US)

( * ) Notice: Subject to any disclaimer, the term of this patent is extended or adjusted under 35 U.S.C. 154(b) by 242 days.

(21) Appl. No.: 11/039,558

(22) Filed: Jan. 20, 2005

(65) Prior Publication Data
US 2006/0157557 A1    Jul. 20, 2006

(51) Int. Cl.
G06K 5/00    (2006.01)
(52) U.S. Cl. ..................................... 235/380
(58) Field of Classification Search ............... 235/380, 235/381, 382, 487, 492; 705/14
See application file for complete search history.

(56) References Cited

U.S. PATENT DOCUMENTS

| | | | |
|---|---|---|---|
| 5,256,863 | A | 10/1993 | Ferguson et al. |
| 5,457,747 | A | 10/1995 | Drexler et al. |
| 5,649,118 | A | 7/1997 | Carlisle et al. |
| 5,806,045 | A * | 9/1998 | Biorge et al. ................. 705/14 |
| 6,648,222 | B2 | 11/2003 | McDonald et al. |
| 2002/0120539 | A1 | 8/2002 | Price |
| 2002/0156676 | A1 | 10/2002 | Ahrens et al. |
| 2003/0018969 | A1 * | 1/2003 | Humpleman et al. .......... 725/34 |
| 2003/0083933 | A1 * | 5/2003 | McAlear ....................... 705/14 |
| 2003/0105711 | A1 | 6/2003 | O'Neil |
| 2004/0064332 | A1 | 4/2004 | Zou et al. |
| 2004/0111329 | A1 | 6/2004 | Moore |
| 2004/0128245 | A1 | 7/2004 | Neal et al. |
| 2005/0021400 | A1 * | 1/2005 | Postrel ....................... 705/14 |

* cited by examiner

Primary Examiner—Thien M. Le
Assistant Examiner—Edwyn Labaze
(74) Attorney, Agent, or Firm—Straub & Pokotylo; Michael P. Straub

(57) ABSTRACT

A portable electronic data storage/processing device, e.g., smart card maintains an account including benefit packages. Each benefit package includes multiple items with associated quantity information. A smart card includes an account benefits interface and a retailer interface, each interface using different security measures. New benefit packages are added to the smart card through the account benefit interface by a benefit provider. Benefits debit request lists including multiple items and associated quantities are submitted to the smart card through the retailer interface. The smart card is the trusted member and checks if all requested items in quantities requested can be debited. If all requests can be fulfilled, the smart card executes the debiting from the currently valid benefit package and returns a transaction success indication to the retailer. If any of the requests of the list cannot be met, the entire request list is rejected and no debiting occurs. Benefit quantity addition is not possible through the retailer interface. Transactions are performed as block transactions.

32 Claims, 15 Drawing Sheets

METHOD AND APPARATUS FOR PERFORMING BENEFIT TRANSACTIONS USING A PORTABLE INTEGRATED CIRCUIT DEVICE

FIELD OF THE INVENTION

The present invention relates generally to the field of information storage and retrieval and, more particularly, to the field of portable integrated circuit electronic data storage and retrieval devices including processing capability suitable for performing transactions involving multiple values, e.g., benefit transactions.

BACKGROUND OF THE INVENTION

Various government and private programs provide clients with supplemental food benefits based on those clients individual nutritional needs.

Many support programs are grant programs. The food benefits granted to clients include specific food items with the amount of food items indicated by non-monetary values. For instance, a client's benefits could consist of several gallons of milk, several pounds of carrots, several pounds of cheese and a quantity of beans. A food benefits grant system is an example of many U.S. Government entitlement programs.

The traditional method of delivering program benefits to clients is for a government agency to provide paper vouchers (or checks) that list the quantities of food items granted. The client presents the voucher to an authorized retailer in exchange for the food items listed on the voucher. The retailer then manually enters the cost for the food items onto the voucher and submits it to the government agency (or its third-party processor) for payment.

Some government and private agencies have attempted or are attempting to convert to an electronic method of delivering these benefits. Two general approaches have been used: on-line and off-line.

The on-line method used a model not unlike traditional debit and credit transaction processing. However, significant challenges exist for performing transactions in an on-line environment. The "account" should be available at all points of use, requiring reliable real-time communications to all sites. Additionally, an account is much more complex than traditional debit and credit accounts as multiple, non-monetary values must be managed and processed during a transaction. This complicates the on-line messaging required to perform a transaction with the account. It remains to be seen if various government and private programs can be performed adequately using the existing transaction processing infrastructure.

Existing off-line methods typically focus on using a smart card to securely deliver benefits. The benefits are "written" to a smart card at the benefit issuance locations and are "read" from the smart card at the retailer locations. Once read at the retailer location, the food item quantities are adjusted and then the updated record of benefits is written back to the smart card. Unfortunately, this method presents a significant security concern: if the benefits are "read" from the smart card, manipulated by the retailer and then written back to the smart card, the possibility of benefits being "added" rather than "subtracted" by the retailer is a very real security risk. Problems resulting in added benefits can occur due to transaction glitches or due to intentional tampering in the retailer device. The electronic systems that are in operation today take great pains to minimize the chances of this occurring, usually by implementing complex cryptographic protocols and/or by extending their trust model to the retailer's processing equipment (payment terminals). However, this approach is problematic, as it requires these types of systems to maintain control over equipment and/or software that is not necessarily owned by the government agency, such as retail payment terminals, electronic cash register software, etc. In many cases this is not practical or cost effective.

Thus, there is a need for providing improved methods and apparatus supporting off-line non-monetary, e.g., government agency type, transaction processing. Methods and apparatus that place benefits on the smart card and use new and novel methods to minimize security risks would be advantageous. Methods and apparatus that include new approaches to preventing a retailer site from inadvertently or fraudulently adding benefits to an existing account would also be beneficial.

Various government and private agencies are attempting to develop and implement new methods of delivering food benefits to their clients. Some such agencies are pursuing an electronic benefit transfer (EBT) solution for issuing food benefits; currently, a paper-based voucher system is in place.

Some government and private agencies require a benefit account to be designed for implementation on a smart card that would be easy for retailers to interface with, while solving the security concerns present with other off-line methods.

Various known approaches to implementing systems using cards will now be discussed. The closest solutions utilize a flat-file structure smart card with limited capabilities. As a result, there are significant concerns with those solutions. To reduce the security risks associated with these cards, complex cryptographic protocols are usually implemented in an attempt to mitigate the risks. However, these protocols usually involve shared secret keys that require complex key management protocols to be implemented; and they require intervention by the retailers. It is inconvenient to have to periodically update many unconnected retailer sites at diverse locations with these secret keys. Also, since the retailer sites, equipment, and personnel with access to the retail equipment are typically not secure, the retailer equipment is subject to tampering.

In view of the above, it should be appreciated that there is a need for methods which can be used to limit the need to use complex keys and allow for management to be provided from a limited number of secure sites, yet still provided adequate security for transactions at each of the retailer sites.

In addition to the security concern issues discussed above, there is also room for improvement in the area of benefit package account structure and transaction methodology and apparatus.

The familiar method of performing transactions typically involves maintaining an account consisting of one value or balance, usually associated with a specified currency, such as dollars or pounds. This type of account (a "traditional account") is typically maintained on a central server (in the traditional debit and credit model) at a bank or other financial entity. Alternatively, this traditional account can be maintained individually on any trusted, secure computing device, such as a smart card, Personal Digital Assistant (PDA) or Personal Computer (PC). These types of individual accounts are commonly called electronic purses. In either scenario, the account is maintained on a device that has the capacity to accept transaction requests and either approve or deny those requests.

Transactions are performed with the traditional account, usually by issuing requests to the account to "debit" or "credit" the account balance. Once received by the account, the logic implementing the account determines if the request can be approved. If it is determined that the debit or credit request can be approved, the account value (balance) is adjusted as appropriate and evidence of the successful transaction is returned to the requesting entity (an "approval"). If the request can not be approved, the account balance is unaffected and the entity requesting the transaction is notified that the transaction can not be performed as requested (a "denial").

This basic method affecting single-value accounts is widely used, although specializations exist to accommodate implementation-specific needs, including authorization, authentication and other security concerns.

Generally, "traditional accounts", where balance values are modified one per transaction, are appropriate for most financial transactions where only one value (or balance) is maintained and manipulated. However, there are a growing number of situations where it is advantageous to: (i) maintain two or more values in one account and (ii) perform transactions with the account affecting one or more of those values in one unit transaction.

Thus, there exists a need to be able to combine two or more related "values" into one "account" and then to transact with that account, affecting one or more of those values in a single, verifiable, unit "transaction".

As discussed above, entitlement programs tend to be more complex to manage in that the clients do not receive money, but are provided with vouchers for different amounts of specific food items. For instance, a typical benefits package could consist of five pounds of carrots, three gallons of milk and two pounds of beans. This benefits package cannot be maintained as a single value account because there are three different values, corresponding to different units of measurement, associated with the account.

Handling multiple values has been accomplished traditionally by using multiple single value accounts which are updated in a series of separate transactions which are normally implemented sequentially. Extending the benefits example above, one could establish a traditional account for pounds of carrots, another for gallons of milk and yet another representing pounds of beans. In this scenario, a purchase of a pound of carrots, a gallon of milk and a pound of beans would be affected by performing one debt transaction with the carrot account, one debit transaction with the milk account, and one transaction with the beans account. Since each transaction is separate, the carrot transaction may be approved while the milk transaction refused, e.g., due to an insufficient amount of milk credits being available. This can lead to a portion of a purchase being approved and other portions being declined. This approach of using 3 separate transactions is not efficient since it involves multiple separate transactions involving manipulation and checking of balances and becomes even more inefficient as additional values have to be acted on.

An alternative method used to implement multiple value accounts involves moving the data representing the accounts' values from the host device to the point at which they will be changed, typically a point-of-sale (POS) device. The POS device manipulates the data, the writes the data back to the host device. In this model, the host device does not perform the transaction processing; it is essentially a storage-only device that holds the account information. As a result, the POS device must be "trusted" by the owner of the account because the POS device manipulated the data. This presents significant security concerns in situations where the POS device is not necessarily managed by the owners of the account, which is common in grant programs.

In view of the above discussion there is a need for new methods and apparatus which facilitate accounts including multiple items with associated non-monetary values representing balances. Approaches which limit the signaling between the retailer device and account storage device would be beneficial. Methods and apparatus which treat the account storage device as the trusted device, minimize retailer access to and manipulation of the account would also be useful. Accordingly, it is an objective of the invention to address one or more of the problems discussed above with implementing a system where multiple balances corresponding to one or more non-monetary units need to be maintained and updated in a secure fashion.

SUMMARY OF THE INVENTION

The present invention is directed to methods and apparatus which are well suited to providing non-monetary benefits and for implementing a benefit system in a reliable and secure manner. In accordance with the invention, benefits account is maintained for an account holder on a portable electronic storage/processing device, e.g. a smart card, that includes a processor, memory and logic and/or interface circuitry for controlling access to the contents of the memory. Logic and associated storage is used to implement the functionality of a Multiple-Item Electronic Benefits Account on the smart card.

Significantly, in accordance with the invention, retailer terminals are precluded from incrementing benefit amounts or adding benefits to the information on the portable device while being able to perform transactions which involve decrementing benefit amounts. Benefit program owner, e.g., provider, terminals are allowed to increment, add and/or decrement information indicating the amount and/or type of benefits to be provided. Thus, the portable device itself limits which operations may be performed based on the type of terminal with which it interacts. In this manner, the main security functions can be implemented in the portable device which is reasonably trustworthy as compared to retailer terminals. Constraints on what type of operations different terminals can perform may be achieved by using different interfaces in the device for interacting with benefit program owner terminals and retailer terminals. The interface used with the program owner terminals normally provides for a higher level of security, e.g., authentication and/or encryption of communicated information, than the level of security provided for interactions with retailer terminals. In some cases the number of account owner, that is, benefit program owner, offices and/or terminals is limited to be less then the number of retailer locations and/or terminals as part of an additional security measure. In some embodiments the ratio of account owner offices and/or terminals, to retailer locations or terminals is kept at a ratio of at least 1:10 and in some cases at least 1:20.

An account owner, e.g., a government agency or private party, is normally the entity that owns a benefit account used to provide benefits to an account holder, e.g., a beneficiary. Thus, an account holder is the individual or individuals for which the account is maintained. For each account, there is typically one electronic storage/processing device, e.g., smart card, used to store account benefit packages, retrieve account benefit packages, and performing debiting from account benefit packages in a block transaction mode of operation. Multiple account benefit packages may be stored on the electronic storage device/processing device, e.g., smart card; for example, each account benefit package may correspond to a different valid time interval and may include different items and different levels of value associated with each item.

A benefits issuer is an entity, e.g., a contracted corporation, most likely authorized by the account owner, which issues benefit packages to an account. The issuing of benefit packages to the account includes the writing of account benefit packages onto the electronic storage/processing device, in a controlled secure environment through the use of a benefit account owner terminal. The account owner and/or benefit issuer controlling an account owner's system uses account owner terminals which can access the electronic storage/processing device, e.g., smart card, via an account owner interface. This interface may be a logical interface implemented via one or more routines, a physical interface, or a combination of a logical and physical interface. The account owner and/or benefit issuer can also read stored benefit packages from the electronic storage device/processing device, e.g., smart card, via the account owner interface as well as write benefit information thereto. Transactions are normally, but not always, implemented in block format, e.g., a complete benefit package read/write operation including a complete set of benefits and associated values.

A retailer is the entity that supplies physical items, e.g., benefits, authorized in the account and debits the amount of supplied items from the account on the electronic storage device/processing device, e.g., smart card. The retailer operates a retailer system including merchant terminals which interface with the electronic storage device/processing device, e.g., smart card, via a retailer interface. The retailer interface may be implemented as a logical, physical or combination of logical and physical interface elements. Merchant terminals can submit a read request including a date/time tag corresponding to the current date and time. The request may also identify the retailer and/or items which may be provided by the retailer. The electronic storage/processing device, e.g., smart card, receives the transaction time, searches through its stored benefit packages and tries to locate a benefit package within a validity range encompassing the transaction time. For a benefit package to be considered valid, in some embodiments, it has to include one or more items which can be provided by the retailer requesting the benefit information.

If the electronic storage/processing device, e.g., smart card, does not find a currently valid benefit package, the merchant terminal is denied access, thus protecting information which the merchant terminal does not have a need to know. If it finds a currently valid benefit package, it returns the benefit package information to the merchant terminal. The merchant terminal can then submit a utilization debit request list including items and values, e.g., quantities as a single transaction. Preferably, the request list is structured by the merchant terminal so as to include only items within the currently valid benefit package and with requested quantity levels less than or equal to the levels specified in the currently valid benefit package. The electronic storage device/processing device, e.g., smart card, receives the debit request list, checks the list against the currently valid benefits package of the account. If all of the requests can be granted, the items are debited from the currently valid benefits package and a transaction success receipt is sent to the merchant terminal. However, in several but not necessarily all embodiments, if any of the requests cannot be met, then the entire utilization request list is rejected; no debiting is performed, and a transaction failure message is sent to the merchant terminal. By rejecting an entire debiting transaction, when the request is out of bounds, the electronic storage device/processing device, e.g., smart card, errs on the side of caution, guarding and protecting its account balances from corruption due to unintentional errors in communications from noise or merchant terminal problems or from intentional attempted manipulation of an account balance due to fraud.

In accordance with the present invention, the electronic storage device/processing device, e.g., smart card, performs the adjustment to the account, and the adjustment of value to the account can be reduced based on requests from the merchant terminal, but cannot be increased based on signals received from merchant terminals. The electronic storage device/processing device, e.g., smart card, is the trusted entity in transactions with the merchant terminal. This is in contrast to some commonly used approaches where the retailer reads and writes account balance information, an approach much more susceptible to data manipulation and fraud, especially in cases where the merchant terminal are not highly secure.

Various features of some but not necessarily all embodiments of the invention will now be described. In one particular exemplary implementation a multiple item electronic benefits account is implemented on an electronic storage device/processing device, e.g., smart card. The account has the following attributes:

a. The account supports and provides information on a number of benefit packages, as specified by the account owner. Each benefit package can be uniquely identifiable and includes information as to validity periods, as defined by the account owner. Each benefit package may included security information, e.g., a private key, which can be used by a retailer to assess the authenticity of the stored benefit package information, used by the portable device to confirm that a terminal it is interacting with is an actual owner or retailer terminal, and/or biometric information which can be used to check the identity of an individual claiming to be the beneficiary. The account owner can determine the security methods and/or security information to be employed for security purposes.

b. Each benefit package includes a variable or fixed number of benefit items, as determined by the account owner. Each benefit item is uniquely identifiable as to the type of item and quantity information is provided for each item. The quantity information may be in different units of measure depending on the item, e.g., quantities of milk may be expressed in ounces, gallons or liters, while quantities of fruits or meat may be expressed in pounds or kilograms.

c. The portable device including the stored benefit information limits retail terminals' access to currently valid benefit packages (based on the validity period of the benefit packages included in the account stored in the device) which can be "read" and redeemed (or "debited") by a retailer via the retail interface.

d. The portable device allows benefit issuers to "issue" benefit packages to the account via the account owner interface. An authentication mechanism defined by the Account Owner protects access to the "write" functionally.

e. The portable device provides a transaction proof for each benefit package issuance and redemption transactions. The account owner determines the method to create this verifiable transaction proof.

Exemplary access conditions necessary to interact with the retail interface or the account owner interface are determined by the account owner and could include PIN or biometric verification of the account holder, cryptographic authentication of interfacing systems or entities, mutual authentication and secure messaging with the electronic storage device/processing device, e.g., smart card, holding the account. The account owner should determine the use of any of these access control measures by considering the security requirements of the overall system using the account.

By providing two separate interfaces to the account, in accordance with the present invention, significant advantages in both the security of the account and in ease-of-use can be realized. The retailer interface allows read access to the currently valid benefit package maintained by the account but, in most embodiments does not allow read access to other benefit packages which may be stored in the account on the electronic storage/processing device, e.g., smart card. Further, the retailer interface limits retailers to reducing values in the currently valid benefit packages, thereby eliminating the possibility that value or benefits could be added to the benefit package by a retailer. The account owner interface provides a higher level of security in at least some embodiments than the retailer interface. This may involve, e.g., using longer encryption keys to encrypt account owner interface communications than encryption keys used to encrypt communications sent through the retailer interface.

Moreover, transactions with the account are performed in many, but not necessarily all embodiments, on a unit basis. That is, a single redemption transaction may include any number of different items, e.g., food items, with associated redemption quantities, to be transacted by the retailer in one, uninterruptible account set of information communicated in a single message. This is in contrast to some known implementations, where transactions are done on an individual item basis, involving many separate messages between a retail terminal and device. Such a message per item approach is less efficient and may involve more overhead, be more time consuming, and/or be more prone to error, particularly in embodiments involving a large number of items being processed by a single merchant terminal.

In various embodiments of the invention multiple-value account transactions can be performed as a unit process. The account maintains two or more values with which a transaction can be performed. The number of values maintained in the account, the logic implemented to approve or deny transactions, and any prerequisite security constraints are defined by the "account owner", or the entity establishing the system in which the account is maintained.

Some embodiments of the invention include a method where an account that maintains two or more separate values can be transacted by causing multiple values corresponding to different non-monetary items to be debited and/or credited in a single transaction in which a set of multiple values is modified.

An account fashioned in this manner allows a number (n) of values (V), as designed by the account owner, to be managed by the account logic in a single transaction. Thus, transactions with the account can affect multiple values (V1, ..., Vn) in one single unit transaction. This eliminates the need to implement a separate traditional account for each of the values, and it reduces the number of transactions that need to be performed to one transaction, no matter how many individual values are affected by the transaction. Moreover, this approach eliminates the security issues that result when one moves the data representing the accounts'
values to another device where the values can be changed prior to being returned to the portable storage device.

This method assumes that the account is maintained on a computing device capable of storing the account values and implementing logic that allows transactions to be approved or denied by the portable device itself. This allows decisions affecting account values to be consolidated into the account logic implemented in the trusted portable device issued by the account owner, eliminating the security and trust issues of simply maintaining the account on a data-storage device with the account values being modified by an external device which is not under the control of the portable device.

Numerous additional benefits, details and variations on the methods and apparatus of the invention are described in the detailed description which follows.

DETAILED DESCRIPTION

Figure 1:
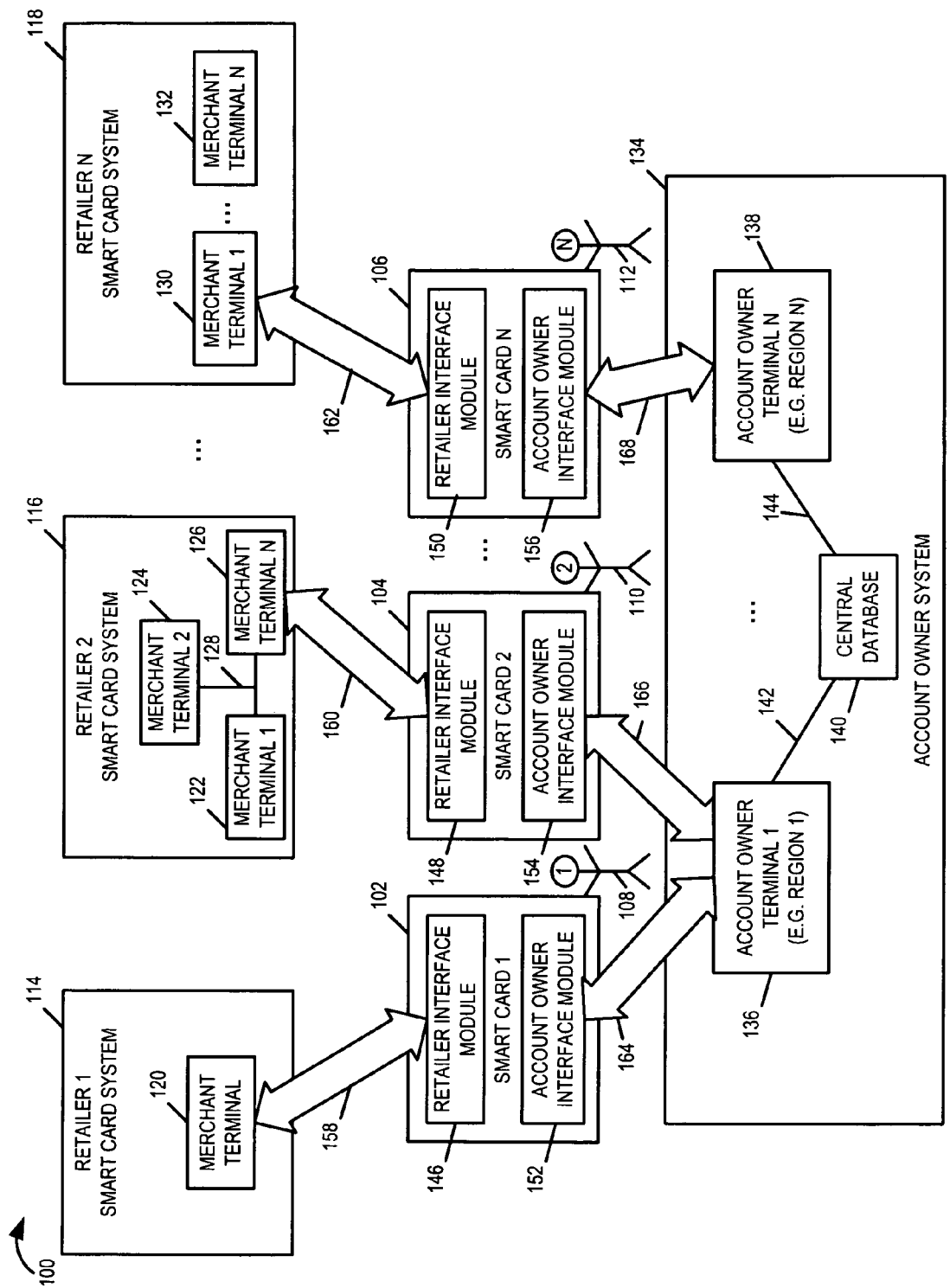
FIG. 1 illustrates an exemplary portable integrated circuit electronic data storage, retrieval and processing system, e.g., a smart card system, implemented in accordance with the present invention and using methods of the present invention.

FIG. 1 is a drawing of an exemplary portable integrated circuit electronic data storage, retrieval and processing device system implemented in accordance with the present invention and using methods of the present invention. The exemplary system of FIG. 1 is illustrated as smart card system 100. However, it is to be understood that the smart card may be replaced by any other portable integrated circuit electronic storage, retrieval and processing device, e.g., a keychain fob, a dog tag, etc. including an integrated circuit and one or more interfaces. Exemplary smart card system 100 may be, e.g., a benefit accounting system. System 100 includes a plurality of smart cards (smart card 1 102, smart card 2 104, smart card N 106). Each exemplary smart card (102, 104, 106) includes logic and associated storage to implement the functionality of a multiple-period multiple-item electronics benefits account, in accordance with the present invention. For each card (102, 104, 106), there is a corresponding account holder (108, 110, 112), an individual or group of individuals for which the benefits account is maintained.

System 100 also includes a plurality of retailer smart card systems (retailer 1 smart card system 114, retailer 2 smart card system 116, retailer N smart card system 118). Each retailer smart card system (114, 116, 118) includes one or more merchant terminals for interfacing with the smart cards (102, 104, 106). Different configurations of the retailer systems are possible, in accordance with the present invention. Retailer 1 smart card system 114 includes a single standalone merchant terminal 120. Retailer 2 smart card system 116 includes a plurality of merchant terminals (merchant terminal 1 122, merchant terminal 2 124, merchant terminal N 126) coupled together via network 128. Merchant terminals (122, 124, 126) may be located at the same and/or different sites. For the merchant terminals located at the same site, e.g., the same store, a portion network 128, may be a local network; for merchant terminals located at different sites, e.g., different stores of the same chain, a portion of network 128 may be, e.g., a private network or the Internet. Retailer N smart card system 118 includes a plurality of terminals (merchant terminal 1 130, merchant terminal N 132), each merchant terminal (130, 132) is independent other merchant terminals operated by retailer N.

System 100 also includes an exemplary account owner system 134. The account owner system 134 may be operated by a benefit issuer, which has been authorized by the account owner, to issue benefits packages to accounts maintained on smart cards (102, 104, 106). For example the account owner system 134 may include infrastructure used in implementing a government food supplement program, said infrastructure may be owned and/or leased by an account owner, e.g., a government assistance agency, and may be operated by a benefit issuer, e.g., a contracted firm or corporation. Exemplary account owner system 134 includes a plurality of account owner terminals (account owner terminal 1 136, account owner terminal N 138). For example, each account owner terminal (136, 138) may correspond to a different region. Each account owner terminal (136, 138) is coupled to a central database 140 via network (142, 144), respectively. Central data base 140 is a data repository in which account holder information, account benefit information, index values associated with each stored benefit package on each smart card for each account holder, account holder authentication information, and transaction information is stored. Transaction information from cards (102, 104, 106) and terminals (120, 122, 124, 126, 130, 132) may be downloaded and/or entered into the central data base, e.g., a different times, and subsequently correlated to detect fraud, patterns of usage, and utilization of allocated benefits. New benefit packages information, when granted to a account holder (108, 110, 112) by the account owner are installed in the central data base 140 and the account benefit information is transferred to the pertinent account on a smart card (102, 104, 106), when convenient via the account owner interface module (152, 154, 156) of one of the smart cards. As will be discussed below, account owners may write new benefit accounts via the account owner interface while retailers/merchants are restricted from increasing benefits and are limited to reading/debiting accounts with such retailer interaction being via retailer interface 146, 148, or 150.

Thus, in accordance with the present invention, the smart cards (102, 104, 106), each include two separate interface modules, a retailer interface module (146, 148, 150) and an account owner interface module (152, 154, 156), respectively. By providing two separate interfaces to the account on the smart card, significant advantages in both the security of the account and in ease-of-use can be realized. Retailer interface module (146, 148, 150) allows a retailer to read a currently valid benefit package maintained by a smart card, but does not allow access to benefit packages which are not currently valid. In addition, through the retailer interface module (146, 148, 150) values in a currently valid benefits package can be reduced, but can not be increased. The account owner interface module (152, 154, 156) allows the account owner system terminals (136, 138) to both read and write account information to smart cards (102, 104, 106), assuming account owner security checks have been satisfied, thus allowing the retrieval of information indicating utilized benefits removed from and new benefit packages to be added onto the smart cards (102, 104, 106). The account owner terminals (136, 138), operated by an authorized benefit issuer and/or the account owner, are typically less numerous in quantity and under a significantly higher level of control and security than the merchant terminals (120, 122, 124, 126, 130, 132), and are thus much less susceptible to be used in benefit fraud schemes.

The retailer interface module (146, 148, 150) and the account owner interface module (152, 154, 156) may be implemented in hardware, software or some combination of hardware/software, provided security boundaries are implemented between the two interfaces. In some embodiments, the different interface modules are implemented in software, with the smart cards (102, 104, 106), using the same hardware interface, e.g., same connector and/or same set of interface pins. In some embodiments, the different interface modules use distinct I/O interface hardware, e.g., two connectors on smart cards (102, 104, 106), one used for the retailer interface and one used for the account owner interface. In some embodiments, different physical pins on the same connector are dedicated to different interfaces. In some embodiments, different protocols, handshaking sequences, and/or keys are required to use a specific interface.

Smart cards (102, 104, 106) can couple to different merchant terminals from the set of merchant terminals (120, 122, 124, 126, 130, 132) through their retailer interface modules at different times. Each smart card (102, 104, and 106) can couple to at least one account owner terminal (136, 138) through its account owner interface module. In FIG. 1

(smart card 1 102, smart card 2 104, smart card 3 106) is shown coupled to (merchant terminal 120, merchant terminal N 126, merchant terminal 1 130) communicating via bi-directional signaling (158, 160, 162), respectively. In addition, in FIG. 1 (smart card 1 102, smart card 2 104, smart card 3 106) is shown coupled to (account owner terminal 1 136, account owner terminal 1 136, account owner terminal N 138) communicating via bi-directional signaling (164, 166, 168), respectively. It is to be understood that in most embodiments, at any one time each smart card can be coupled to one terminal, e.g., either a merchant terminal or an account owner terminal.

Figure 2:
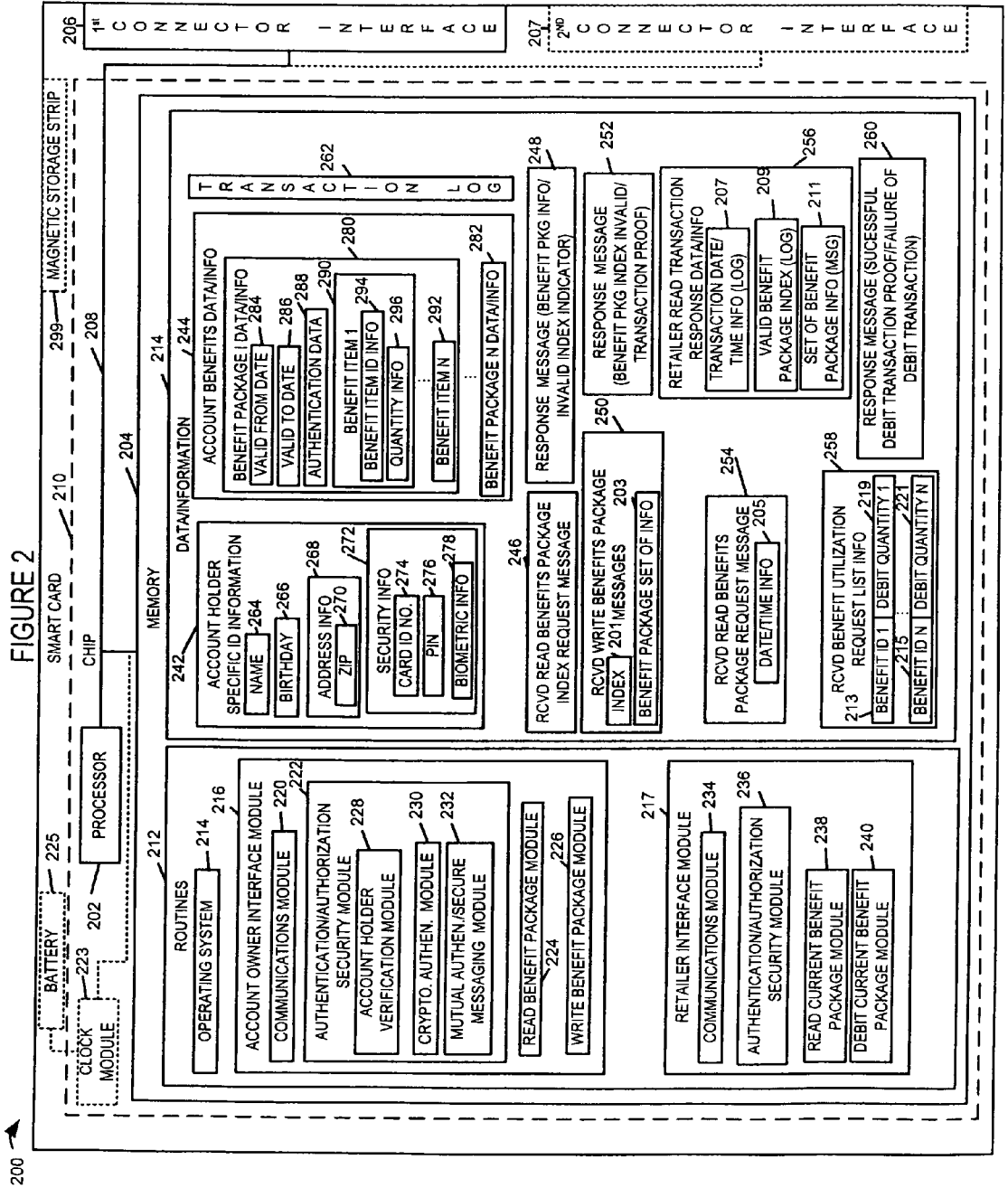
FIG. 2 illustrates a more detailed representation of the exemplary portable storage/processing device, e.g., smart card, shown in the system of FIG. 1, implemented in accordance with the present invention.

FIG. 2 is a drawing of an exemplary portable information storage device 200, e.g., a smart card, implemented in accordance with the present invention and using methods of the present invention. Exemplary smart card 200 may be used as any of the smart cards 102, 104, 106 of benefit accounting system 100 of FIG. 1. Smart card 200 includes a processor 202, a memory 204, a $1^{st}$ connector interface 206, and in some embodiments a $2^{nd}$ connector interface 207, which are coupled together via a bus 208 over which the various elements may interchange data and information. In some embodiments, interfaces 206 and/or 207 may be wireless interfaces, e.g., RF interfaces. The processor 202 and memory 204 are included as part of a chip 210 included in smart card 200. Memory 204 includes routines 212 and data/information 214. The processor 202, e.g., a CPU, executes the routines 212 and uses the data/information 214 in memory 204 to operate the smart card and implement the methods of the present invention. In embodiments without the $2^{nd}$ connector interface 207, connector interface 206 provides a physical or wireless interface to merchant terminals, e.g. terminal 120, and account owner terminals, e.g., terminal 136. In embodiments including both $1^{st}$ and $2^{nd}$ connector interfaces 206, 207, one connector interface, e.g., $1^{st}$ connector interface 206, is used to physically connect or wirelessly couple to merchant terminals, while the other interface, e.g., $2^{nd}$ connector interface 207, is used when physically connecting or wirelessly coupling to account owner terminals.

Routines 212 include an operating system 214, an account owner interface module 216 and a retailer interface module 217. Operating system 214 manages the basic housekeeping operations of smart card 200 such as memory 204 apportioning, task ordering, and management of the flow of information into and out of the processor 202. Account owner interface module 216 and retailer interface module 217 uses functions of the operating system 214 when performing their tasks.

Account owner interface module 216 performs operations pertaining to the exchange of information between smart card 200 and an account owner terminal, e.g., terminal 136, said exchanged information being conveyed through the account owner interface. The account owner interface is the interface to the account, maintained on smart card 200, that the account owner and the authorized benefits issuers use to read account information and to write benefit packages to the account. The account owner interface may be implemented using software, hardware or a combination of software and hardware. While some of the hardware used to implement the account owner interface may be shared with the merchant interface, the two interfaces differ in at least some software and/or hardware resulting in different capabilities when accessing the card via the different interfaces.

Interactions with the account by the account owner are performed at the benefit package level. Once a benefit package is written to the account on smart card 200, in some embodiments, the benefit items contained in the package cannot be individually manipulated via the account owner interface. However, in some embodiments, the benefit package can be overwritten with a new one. Account owner interface module 216 includes a communications module 220, an authentication/authorization security module 222, a read benefits package module 224, and a write benefits package module 226.

Communications module 220 includes information on the protocols, e.g., authentication protocols and messaging transfer protocols, used for communications through the account owner interface. Authentication/authorization security module 222 controls access to the card through the account owner interface. The selection of access conditions and control measures is determined by the account owner after consideration of the system's security requirements. However, the core implementation of the account and methods of the present invention are not affected by a specific security implementation. Authentication/authorization security module 222, depending on the embodiment, includes one or more of the following: an account holder verification module 228 which uses, e.g., a PIN or biometric information, a cryptographic authentication module 230, and a mutual authentication/security module 232.

Read benefits package module 224 performs operations that allow the account owner to retrieve the contents of a benefits package stored on the smart card 200. Read benefits package module 224 receives a request message including a parameterized value, e.g., an index of a benefits package to retrieve, from an account owner terminal. The number of benefits packages maintained on smart card 200 is determined by the account owner or owners when the smart card 200 is configured. The receive benefits package module 224 checks the validity of the requested index of the benefits package to be read. If the index is valid the receive benefits package generates and communicates a response to the account owner terminal including the indicated benefits package. If the requested index is invalid, the read benefits package module 224 sends the account owner terminal a request failure message.

Write benefits package module 226 performs operations that allow the account owner to write a benefits package to the account maintained on smart card 200. Write benefits package module 226 receives, e.g., from an account owner terminal 136, 138, a write request message including an index and a corresponding set of benefit package information. The benefits package module 224 checks the validity of the index, and if valid, writes the benefit package to memory on the smart card associated with the index and returns a transaction proof to the account owner terminal. If the index was invalid, then the write benefits package module 224 returns a benefit package index invalid response message to the account owner terminal.

Retailer interface module 217 performs operations pertaining to the exchange of information between smart card 200 and merchant terminals, e.g., terminal 120, said exchanged information being conveyed through the retailer owner interface. The retailer interface is the interface to the account, maintained on smart card 200, through which the merchant terminal can retrieve current valid benefit package information, submit requests for benefit utilization, and receive transaction responses. The retailer interface is the interface used by retailers to perform redemption operations with the account maintained on smart card 200 and, as discussed above, does not support adding of benefits. In various embodiments, the retailer interface minimizes the visibility to the benefits packages managed by the account on smart card 200 to the currently valid benefits package, based on the current date and time, and in some embodiments, further restricts access to those benefits packages which include benefits which can be supplied by the particular retailer. In accordance with the present invention, in various embodiments, access through the retailer interface of the smart card can result in the reduction of benefit values stored on smart card 200, but cannot result in an increase in benefit values stored on smart card 200. Retailer interface module 217 includes a communications module 234, an authentication/authorization security module 236, a read benefits package module 238, and a debit current benefits package module 240.

Communications module 234 includes information on the protocols, e.g., authentication protocols and messaging transfer protocols, used for communications through the retailer interface. Authentication/authorization security module 236 controls access to the card through the retailer interface. The selection of access conditions and control measures is determined by the account owner after consideration of the system's security requirements. Typically, security module 236 used for the retailer interface is different than security module 222 used for the account owner interface. For example, the account owner security module 222 may make wider use of cryptographic keys since the account owner terminals are more securely controlled and limited in number, while the retailer interface security module 236 may employ other methods as the sharing and distribution of cryptographic keys among a wide number of retailer terminals in a much less secure environment may not be advantageous to card security. However, the core implementation of the account and methods of the present invention need not be limited to a specific security implementation, and a wide variety of security techniques may be used. Authentication/authorization security module 236 includes at least some of an account holder verification module, e.g., using a PIN or biometric information, a cryptographic authentication module, and a mutual authentication security messaging module.

Read current benefits package module 238 performs operations that allows a merchant terminal to retrieve the contents of a currently valid benefits package stored on the smart card 200. Read benefits package module 224 receives a request message including a parameterized value, e.g., a value representing the current date/time which establishes the transaction date/time, from a merchant terminal. Module 238 determines if any of the benefit packages included in the account on the smart card 200 are valid for the date/time supplied. If a valid benefit package is identified, module 238 stores the transaction date/time and the valid benefit package index in its transaction log, and then returns the contents of the valid benefit package to the merchant terminal via message transfer. If module 238 does not find a valid benefit package corresponding to the current date/time in the request message, then module 238 sends a failure indication message to the merchant terminal.

Debit current benefits package module 240 can be entered if the read current benefits package module 238 finds and returns a valid current benefits package. Debit current benefits package module 238 receives a benefit utilization request list including a plurality of benefit IDs and quantities of each corresponding benefit to be debited from the current benefits package. Module 240 determines if sufficient quantities exist in the current benefits package for each of the benefit items requested to be deducted from the current benefits package. If all requested benefit items in the quantities requested in the benefit utilization list can be deducted from the current benefits package, the benefit package's benefit item quantities are adjusted and a transaction proof is prepared and returned to the merchant terminal. However, if all requested items in requested quantities cannot be deducted from the current benefits package, then module 240 sends a failure of debit transaction message to the merchant terminal. Thus transactions are approved or denied on a transaction basis where a transaction normally involves multiple values to be altered. Failure of a single value change to satisfy the benefit package constraints will result in a transaction being denied. Thus, the burden is on the merchant terminal to make sure the full transaction is correct prior to submission since partial transactions will not be entered with other portions being denied.

Data/information 214 includes account holder specific ID information 242, account benefits data/info 244, received read benefits package index request message 246, response message (benefit package information/invalid index indicator) 248, received write benefits package messages 250, response message (benefit package index invalid/transaction proof) 252, received read benefits package request message 254, retailer read transaction response data/info 256, received benefit utilization request list information 258, response message (successful debit transaction proof/failure of debit transaction) 260, and transaction log 262.

Account holder specific information 242 includes information associated with the account holder and/or account holder's issued smart card 200 used by authentication/authorization security modules 222, 236. Account holder specific information 242 includes, e.g., the account holder's name 264, the account holder's birth date 266, the account holder's address information 268 including ZIP code 270, and security information 272. The security information includes a card ID number 274, a personal identification number (PIN) 276, and account holder biometric information 278, e.g., fingerprint information, DNA information, feature recognition information, eye scan information, voice identification information, etc. Some or all of the account holder specific ID information 242 may be encoded in magnetic information 299, e.g., a card identification number.

Account benefits data/info 244 includes a plurality of sets of benefit package data/info (benefit package 1 data info 280, benefit package N data/information 282). Benefit package 1 data/information 280 includes a valid from date 284, a valid to date 286, authentication data 288, a plurality of benefit items (benefit item 1 290, benefit item N 292). The number of items in each benefit package may be variable or fixed as determined by the account owner. Each item in a benefits package includes item identifier ID information and associated non-monetary quantity information. For example, consider items in an exemplary benefits package: milk-ID# 0001-quantity 5 gallons, bread-ID# 0002-quantity 10 12-oz packages, potatoes-ID# 0003-quantity 20 lbs. Benefit item 1 290 includes benefit item ID information 294 and quantity information 296. Different units of measurement, e.g., gallons, lbs, etc., may be used for the quantities of different items. Dates 284 and 286 are used to identify a range of validity during which time benefit package 280 may be read and debited from by a merchant terminal. Authentication data 288 may include authentication data associated with the benefit package.

Received read benefits package index request message 246 is an input to read benefits package module 224, while response message (benefits package info/invalid index indicator) 248 is an output from module 224. The index in message 246 should identify one of the stored benefit packages residing in account benefit data/info 244.

Received write benefits package messages 250 is an input to write benefits package module 226, while response message (benefits package index invalid/transaction proof) 252 is an output of module 226. Messages 250 includes an index 201 and a benefit package set of information 203. In some embodiments, for the index 201 to be valid, it should be in a range of acceptable index values used on card 200. In some embodiments, for the index value 201 to be valid, it should be the next sequence value in a set of numbers following a circular ordered sequence, e.g., 1, 2, 3 ..., 512, 1 ..., with respect to the most recently previously written benefit package. Benefit package set of information 203 is a new set of benefits, corresponding to benefit package set 280, being issued to the benefit holder and being stored in account benefits data/info 244.

Received read benefits package request message 254 serves as an input to read current benefit package module 238 which is responsible for responding to the message. Retailer read transaction response data/information 256 is an output of module 238, that is generated, e.g., in response to a retailer read request or other transaction request. Received read benefits package request message 254 includes date/time information 205. Retailer read transaction response data/info 256 includes transaction date/time info 207, a valid benefit package index 209 and a set of benefit package information 211. Date/time info 205 is converted by module 238 into transaction date/time information 207 and stored in the smart card's transaction log. The transaction date/time is used by module 238 to search the valid time and/or date ranges defined by time interval info (such as info 284, 286) in the account benefits data/info 244 sets of information. If the transaction date/time info 207 falls within a range of a benefit set, the index number, used for identification and/or access of the benefit set, is stored in valid benefit package index 209 and in the transaction log. Then, the set of benefit package data/info corresponding to the index number is output to the merchant terminal in message 211.

Received benefit utilization request list information 258, used by a retailer to complete a benefit debit transaction as part of supplying benefits to the account holder, is an input to debit current benefit package module 240, while response message (successful debit transaction proof/failure of debit transaction) 260 is an output of module 240. The received benefit utilization request list information 258 includes a plurality of benefit IDs (benefit ID 1 213, benefit ID N 215), and a corresponding plurality of debit quantities (debit quantity 1 217, debit quantity N 219). In accordance with one feature of the present invention, the debit current benefit package module 240 treats the entire transaction represented by list 258 as a single entity, either success with complete execution of the requested debiting, e.g., of multiple values, or failure with no execution of any debiting. Prior to submitting a benefit utilization request list 258, the merchant terminal will have received a valid benefit package which identifies benefit item IDs and quantities in response to a read benefits package request; therefore, a properly operating merchant terminal should be expected to submit a debit list 258 that is a subset of the currently valid benefit package and which does not exceed the available benefit quantities for various items. Thus, the merchant terminal is responsible for initially determining that a transaction will satisfy the available benefits constraints or face the entire transaction being denied.

Transaction log 262 includes information recorded corresponding to successful and unsuccessful transactions via the retailer interface including, e.g., time-tagged copies of debit requests, transaction proofs and reject messages. Transaction log 262 may also include information corresponding to any unsuccessful attempts to access the account owner interface control functions.

Account holder specific ID information 242, account benefit data/info 244, and transaction log 262 are typically stored in non-volatile memory.

In some embodiments, a date/time clock module 223 and a battery module 225 are included as part of smart card 200 to be used as an independent timing verification source to prevent fraud by an individual setting a merchant terminal's date/time setting intentionally incorrect to access a benefit package which should not be accessible at the time of request. Thus, in some embodiments, the internal date/time information is used to determine benefit package availability and control access to benefit packages.

In some embodiments, smart cards 200 are reusable, and additional benefit packages can be added, e.g., when smart card is reconnected to account owner terminal at a later date. In some embodiments, the additional benefit packages can overwrite existing, e.g., expired, benefit packages.

In some embodiments, smart cards 200 are disposable. Following a one-time write of a sequence of a plurality of sets of benefit packages, e.g., a set of six one month duration benefit packages, the write benefits package module 226 performs an operation resulting in the permanent disablement of the account owner interface from writing any addition benefit packages to the smart card. In some embodiments, the permanent disablement is through software, while in other embodiments, the permanent disablement is through controlled hardware modification, e.g., damage, to smart card 200, e.g., a fuse-link being severed at a control point. In some embodiments, the permanent write disablement is achieved due to signaling from the account owner terminal, independent of the operation of modules in smart card 200. In such embodiments, new cards may be issued to account holders periodically. In this manner security is improved and the loss of a card results in a limited loss of benefits to the user and does not interfere with issuance of future benefits.

Figure 3:
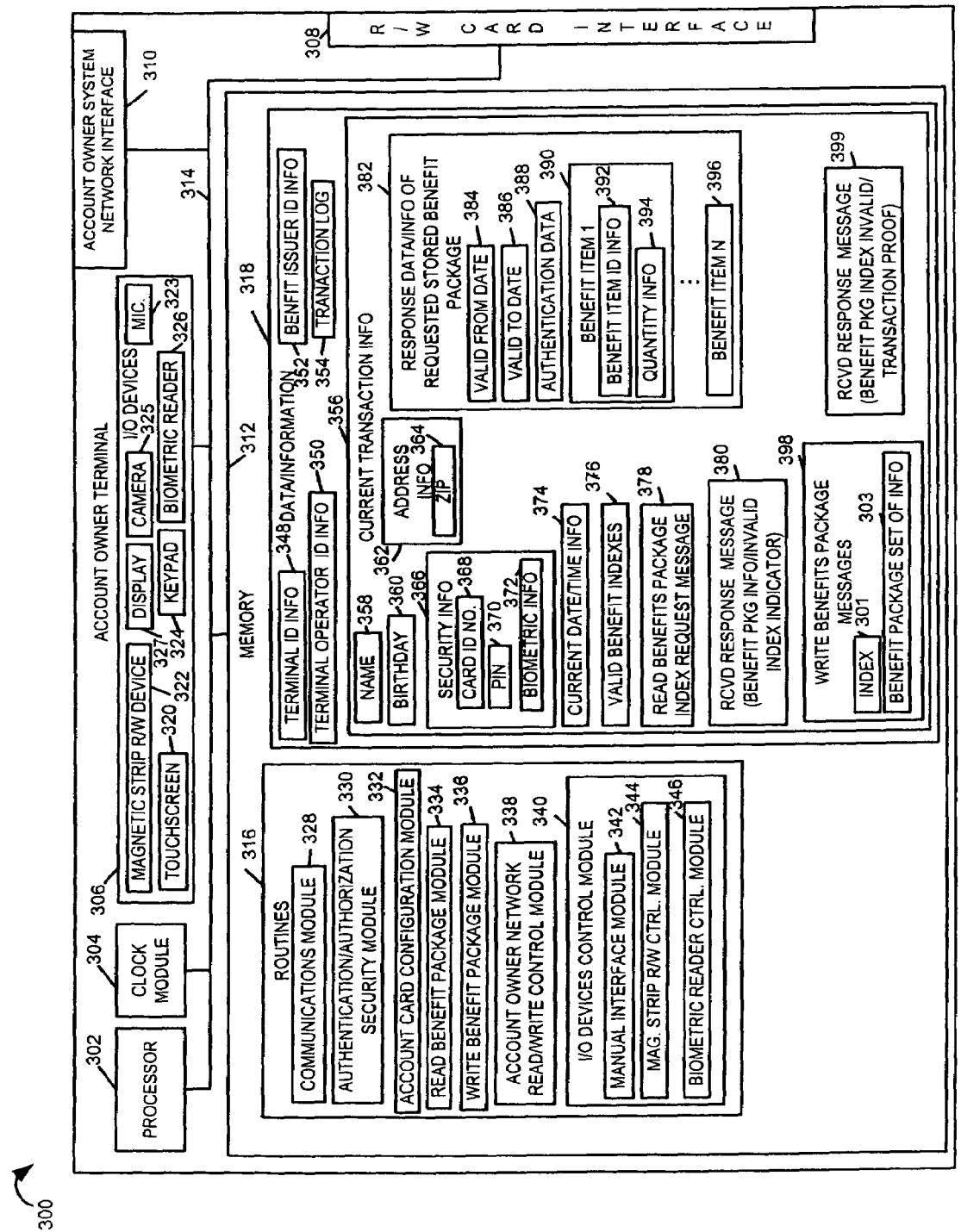
FIG. 3 is a drawing of an exemplary account owner terminal, implemented in accordance with the present invention and using methods of the present invention.

FIG. 3 is a drawing of an exemplary account owner terminal 300, implemented in accordance with the present invention and using methods of the present invention. Exemplary account owner terminal 300 may be any of the account owner terminals 136, 138 of system 100 of FIG. 1. Account owner terminal 300 includes a processor 302, a clock module 304, I/O devices 306, a read/write smart card interface 308, an account owner system network interface 310, and a memory 312 coupled together via a bus 314 over which the various elements may interchange data and information.

The memory 312 includes routines 316 and data/information 318. The processor 302, e.g., a CPU, executes the routines 316 and uses the data/information 318 in memory 312 to control the operation of the account owner terminal 300 and implement methods of the present invention.

Clock module 304 provides an accurate date/time reference to be used in terminal 300 operations. Account owner system network interface 310 couples the account owner terminal 300 to other elements within the account owner system 134 including central database 140. Read/write smart card interface 308 mates to either $1^{st}$ connector interface 206 or $2^{nd}$ connector interface 207, whichever connector interface on smart card 200 that has been designated to provide the physical or wireless connectivity means for the account owner interface functionality. I/O devices 306 include touch-screen 320, magnetic strip read/write device 322, microphone 323, keypad 324, display 327, camera 325, and biometric reader 326. I/O devices 306 allow an account owner and/or a benefit issuer to access, load, and retrieve information from smart card 200. In addition, the I/O devices are used for initially obtaining account holder specific ID information which is stored on card 200 and for verifying that the person in possession of the smart card 200 is the correct recipient for certain sets of benefit packages to be loaded on smart card 200.

Routines 316 includes a communications module 328, an authentication/authorization security module 330, an account card configuration module 332, a read benefits package module 334, a write benefits package module 336, an account owner network read/write control module 338, and I/O devices 306 control module 340. Communications module 328 handles the communication protocols used by account owner terminal 300 and is the counterpart to communications module 220 in smart card 200.

Authentication/authorization security module 330 is the counterpart to module 222 in smart card 200 operating in coordination with module 222 to control security over the account owner interface. In addition, authentication/authorization security module 330 controls access of an operator, e.g., benefit provider, to use account owner terminal 300 and uses information such as the benefit issuer ID information 352 and terminal operator ID information 350.

Account card configuration module 332 performs initialization operations on a new smart card 200, e.g., structuring the memory to be able to accept benefit packages following a predetermined format and indexing scheme. In addition configuration module 332 controls the loading of account holder ID specific information 242 on smart card 200, and writing of any magnetic strip information, if so implemented.

Read benefits package module 334 is the counterpart of module 224 of smart card 200 and operates in coordination with module 224 to control the transfer of benefit package information stored on smart card 200 to account owner terminal 300, e.g., benefit packages which are expected to have been previously utilized to some extent. Write benefits package module 336 is the counterpart of module 226 of smart card 200 and operates in coordination with module 226 to load new benefit packages onto smart card 200, e.g., new benefit packages issued to the account holder corresponding to smart card 200.

Account owner network read/write control module 338 controls the operation of account owner system network interface 310 to control the flow of retrieved benefit packages from smart card 200 to central database 140, e.g., for evaluation and checking against debit information submitted by retailers. Module 338 also controls the retrieval of information from database 140, e.g., account holder specific ID information, the indexes of previously issued benefit packages issued to the account of smart card 200 and new benefit packages to be transferred to smart card 200.

I/O devices control module 340 includes a manual interface control module 342 controlling operation of the touch-screen 320, keypad 324, microphone 323, camera 325, and display 327. I/O devices control module 340 also includes a magnetic strip R/W control module 344 for controlling operation of magnetic strip R/W device 322 and a biometric reader control module 346 for controlling the operation of biometric reader devices 326.

Data/information 318 includes terminal ID information 348, e.g., an identifier uniquely identifying terminal 300 in account owner system 134, terminal operator ID information 350, e.g., an employee number and/or employee biometric information, benefit issuer ID information 352, e.g., a code number identifying the benefit provider corporation to the account owner.

Data/information 318 also includes a transaction log 354 and current transaction information 356. The transaction log 354 may include information being entered and/or communicated through I/O devices 306 and through R/W card interface 308, as well as terminal ID info 348, terminal operator ID information 350, and benefit issuer ID information 352. Information in transaction log 354 may include date/time tag information.

Current transaction information 356 includes account holder name 358, account holder birth date 360, account holder address information 362 including zip code 364, and security information 366 including card ID number 368, PIN 370 and biometric information 372. Information (358, 360, 362, 364, 366, 368, 370, 370, 372) is obtained as input through I/O devices 306 and is the counterpart to similarly named stored information (264, 266, 268, 270, 272, 274, 276, 278), respectively, on smart card 200. Matching between stored account holder ID info on smart card 200 with information obtained currently by account holder interaction with I/O devices 306 facilitates authentication and authorization with regard to access through the account owner interface.

Current transaction information 354 also includes current date/time information 374, e.g., obtained by clock module 304 and used for generating data/time tags to correspond to transaction information. Valid benefit indexes 376 include, e.g., information identifying benefit indexes corresponding to previously stored benefit packages residing on smart card 200, information identifying the last index used on smart card 200, information identifying the range of benefit indexes that may be used on smart card 200, and information identifying the next value that should be used for a new benefit package to be stored on smart card 200. Valid benefit indexes information 376 may have been stored for each smart card 200 in central database 140, and retrieved when needed by account owner terminal 300.

A read benefits package index request message 378 is generated as an output of read benefits package module 334 and is directed to smart card 200. Received response benefits package message (benefit package info/invalid index indicator) 380 is a received message that is supplied as an input to module 334. A smart card 200 is normally the source of message 380. Response data/info of requested stored benefit package 382 represents exemplary information conveyed in message 380, assuming the requested index in message 378 was deemed valid by smart card 200. Information 382 includes: valid from date 384, valid to date 386, authentication data 388, benefit item 1 390 including, e.g., benefit item ID info 392 and quantity info 394, and benefit item N info 396. The information included in response data/info of requested stored benefit package 382 is a copy of one of the N benefit packages 280, 282 currently residing on smart card 200. The quantity info 394 included for each benefit item in information set 382 is expected to have been reduced, from the original values allocated, by the debiting transactions at one or more merchant terminals.

Write benefits package messages 398, include, e.g., an index 301 and a benefit package set of information 303, is generated by and is output by write benefits package module 336. The information 303 is directed to smart card 200. Index 301 identifies the index to be used on smart card 200 to be associated with the new benefit package set, e.g., a new allocated set of benefits for the card holder by the account owner, the benefit set 303 should have the format of benefit package 280. Received response message (benefit package index invalid/successful transaction proof) 399 is a message returned from smart card 200 indicating the status as to whether or not the benefit package 303 in message 398 has been accepted and stored on smart card 200.

Figure 4:
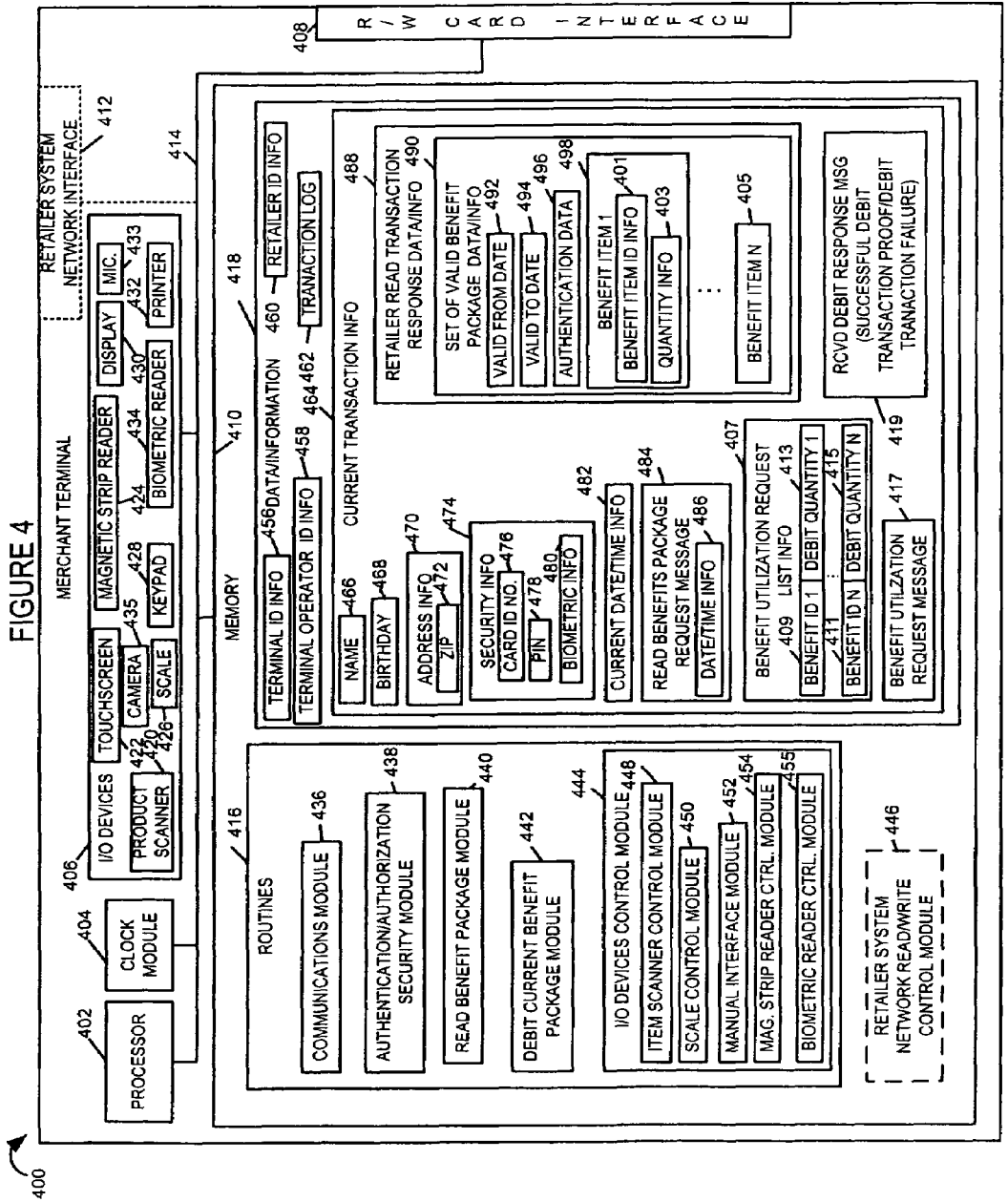
FIG. 4 is a drawing of an exemplary merchant terminal, implemented in accordance with the present invention and using methods of the present invention.

FIG. 4 is a drawing of an exemplary merchant terminal 400, implemented in accordance with the present invention and using methods of the present invention. Exemplary merchant terminal 400 may be any of the merchant terminals 120, 122, 124, 126, 130, 132 of system 100 of FIG. 1. Merchant terminal 400 includes a processor 402, a clock module 404, I/O devices 406, a read/write smart card interface 408, a memory 410, and in some embodiments a retailer system network interface 412, coupled together via a bus 414 over which the various elements may interchange data and information.

The memory 410 includes routines 416 and data/information 418. The processor 402, e.g., a CPU, executes the routines 416 and uses the data/information 418 in memory 410 to control the operation of the merchant terminal 400 and implement methods of the present invention.

Clock module 404 provides an accurate date/time reference to be used in terminal 400 operations. Retailer system network interface 412 couples the retailer terminal 400 to other elements within the retailer system 116. Read/write smart card interface 408 mates to either $1^{st}$ connector interface 206 or $2^{nd}$ connector interface 207, whichever connector interface on smart card 200 that has been designated to provide the physical connectivity means for the retailer interface functionality. I/O devices 406 include product scanner 420, e.g., a bar code reader, touch-screen 422, magnetic strip reader 424, scale 426, keypad 428, display 430, printer 432, biometric reader 434, camera 435, and microphone 433. I/O devices 406 allows a merchant terminal operated by a retailer to receive input authentication and verification information from the person presenting smart card 200 to be used in validating the person as the proper card holder, e.g., via touch-screen 422, keypad 438, magnetic strip reader 424, and/or biometric reader 434. I/O devices 406 also receive input used to tabulate debit information. For example, debit items may be input via the product scanner 420, touch-screen 422, or keypad 428, while debit quantities may be input via scale 426, touch-screen 422, or keypad 428. Transaction results may be output on the display 430 and/or printer 432.

Routines 416 include a communications module 436, an authentication/authorization security module 438, a read benefits package module 440, a debit current benefit package module 442, an I/O devices control module 444, and in some embodiments, a retailer system network read/write control module 446. Communications module 436 handles the communication protocols used by merchant terminal 400 and is the counterpart to communications module 234 in smart card 200.

Authentication/authorization security module 438 is the counterpart to module 236 in smart card 200 operating in coordination with module 236 to control security over the retailer interface. In addition, authentication/authorization security module 438 controls access of an operator, e.g., a retailer's employee, to use retailer terminal 400 and uses information such as the retailer ID information 460 and terminal operator ID information 458.

Read benefits package module 440 is the counterpart of module 238 of smart card 200 and operates in coordination with module 238 to control the transfer of a set of currently valid benefit package information stored on smart card 200 to retailer terminal 400. Debit current benefits package module 442 is the counterpart of module 240 of smart card 200 and operates in coordination with module 240 to debit benefits from the currently valid benefit package stored on smart card 200.

Retailer system network read/write control module 446 controls the operation of retailer system network interface 412 to control the flow of information between the merchant terminal 400 and other elements within the retailer system, e.g., the flow of transaction summaries to central retailer accounting server.

I/O devices control module 444 includes an item scanner control module 448 controlling product scanner 420 operation, a scale control module 450 that controls operation of the scale 426, a manual interface control module 452 that controls operation of the following: the touch-screen 422, keypad 428, display 430, printer 432, microphone 433, and camera 435. I/O devices control module 444 also includes a magnetic strip reader control module 454 for controlling operation of magnetic strip reader 424 and a biometric reader control module 455 for controlling the operation of biometric reader devices 434.

Retailer system network read/write control module 446 controls the operation of retailer system network interface 412 to control the flow of information between the merchant terminal 400 and other elements within the retailer system, e.g., the flow of transaction summaries to central retailer accounting server.

Data/information 418 includes terminal ID information 456, e.g., an identifier uniquely identifying terminal 400 in retailer system, e.g., system 116, terminal operator ID information 458, e.g., an employee number and/or employee biometric information, retailer ID information 460, e.g., a code number identifying the retailer to the account owner.

Data/information 418 also includes a transaction log 462 and current transaction information 464. The transaction log 462 may include information being entered and/or communicated through I/O devices 406 and through R/W card interface 408, as well as terminal ID info 456, terminal operator ID information 458, and retailer ID information 460. Information in transaction log 462 may include date/time tag information. Transaction log 462 includes a copy of information on each hard copy debit transaction receipt generated by terminal 400 and given to a cardholder. In networked retailer systems, the transaction log 462 may be downloaded, e.g., periodically such as once daily or at the end of an employee's shift, to a retailer accounting database.

Current transaction information 464 includes account holder name 466, account holder birth date 468, account holder address information 470 including zip code 472, and security information 474 including, e.g., card ID number 476, PIN 478 and biometric information 480. Information (466, 468, 470, 472, 474, 476, 478, 480) is obtained as input through I/O devices 406 and is the counterpart to similarly named stored information (264, 266, 268, 270, 272, 274, 276, 278), respectively, on smart card 200. Matching between stored account holder ID info on smart card 200 with information obtained currently by account holder interaction with I/O devices 406 facilitates authentication and authorization with regard to access through the retailer interface.

Current transaction information 464 also includes current date/time information 482, e.g., obtained by clock module 404 and used for generating date/time info 486 in request message 484, as well as date/time tags to accompany transaction receipts.

Read benefits package request message 484 is generated and output by read benefits package module 440. The message 484 is directed to smart card 200 and normally includes date/time info 486. Retailer read transaction response data/info 488 is an input message supplied to module 440 that is received from smart card 200. The message 488 indicates that a currently valid benefit package is available for debiting. If there is not a currently valid benefit package on smart card 200, then a failure indication message is communicated in place of message 488. Retailer read transaction response data/info 488 include a set of valid benefit package data/info 490 including valid from date 492, valid to date 494, authentication data 496, benefit item 1 498 including benefit item ID info 401 and quantify info 403, benefit item N info 405. The set of benefit info 490 having been selected from among the sets 280, 282 residing on smart card 200 based upon date/time info 486.

Benefit utilization request list info 407 includes a plurality of benefit item IDs (benefit item ID 1 409, benefit item ID N 411), and corresponding debit quantities (debit quantity 1 413, debit quantity N 415), respectively. The quantities for different items may be expressed using different non-monetary units. Items and quantities on the list 407 are items which have been processed through merchant terminal 400, e.g., scanned, and measured in terms of quantity, e.g., counted or weighted, which meet criteria specified in set of valid benefit package data/info 490; such item and current quantities can be placed on list 407 by debit module 442. For example, each item and quantity on list 407 should also be included in benefit package 490 in a quantity level less than or equal to the quantity specified in info 490. The set of information in list 407 should be a subset of the information in benefit package 490. Benefit utilization request message 417 which incorporates benefit utilization request list info 407 is generated by debit module 442 and forwarded to smart card 200.

Received debit response message (successful transaction proof/failed transaction) 419 is a response message from smart card 200 indicating success or failure of the entire debit transaction. In accordance with the present invention, if the smart card cannot debit the entire request, the entire request is rejected.

Figure 5:
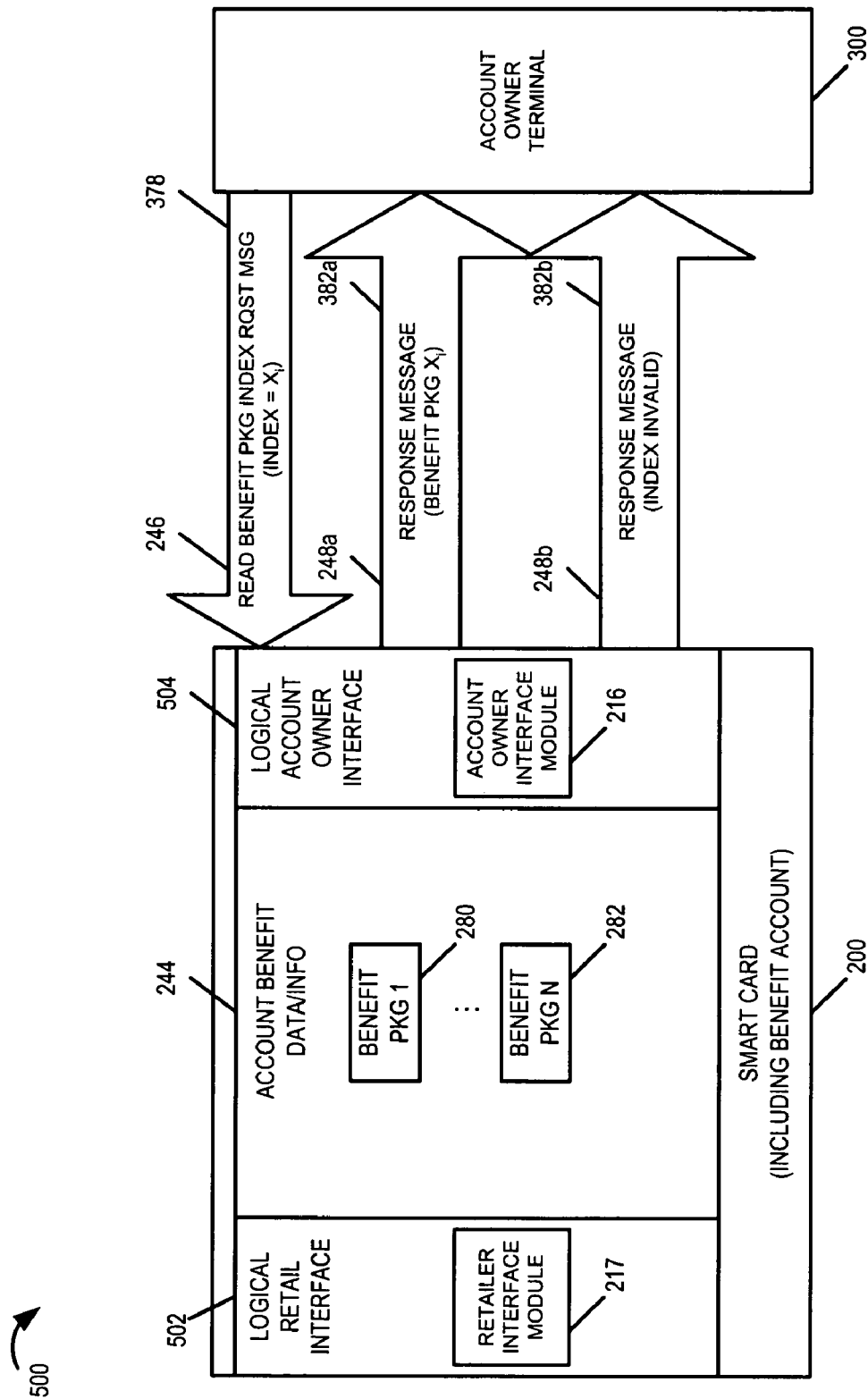
FIG. 5 is a drawing illustrating exemplary signaling which occurs during the process of reading a benefit package by an account owner terminal from a smart card, in accordance with methods of the present invention.

FIG. 5 is a drawing 500 illustrating exemplary signaling in a read of a benefit package by an account owner terminal 300, in accordance with methods of the present invention. Drawing 500 illustrates an exemplary smart card 200. The smart card 200, as previously described, includes modules and data storage for maintaining a benefit account for a cardholder. Smart card 200 includes a plurality of benefit packages (benefit package 1 280, benefit package N 282). Smart card 200 includes a logical retail interface 502 including retailer interface module 217 and a logical account owner interface 504 including account owner interface module 216. Each logical interface (502, 504) can be implemented in hardware, software, or a combination of hardware and software. Each logical interface (502, 504) can, and generally does, have different security authorization/authentication requirements, protocols and procedures. Account owner terminal 300 accesses account benefit info 244 through logical account owner interface 504, while merchant terminals 400 access account benefit info 244 through logical retailer interface 502. FIG. 5 illustrates exemplary signaling as an account owner terminal 300 attempts to read a stored benefit package on smart card 200. The account owner terminal generates and sends a read benefits package index request message 378 including a benefit package index value $X_i$, which is received by smart card 200 through logical account owner interface 504 as message 246. The account owner interface module 216 checks if the requested index $X_i$ matches one of the stored benefit packages (280, 282) on card 200. If a match is found, the corresponding benefit package is retrieved from info 244 and forwarded in affirmative response message 248*a* to the account owner terminal where it is received as message 382*a*. However, if the index $X_i$, requested does not match any of indexes corresponding to stored benefit packages (280, 282), then an index invalid response message 248*b* is generated by module 216 and sent to the account owner terminal 300, where it is received as message 382*b*.

Figure 6:
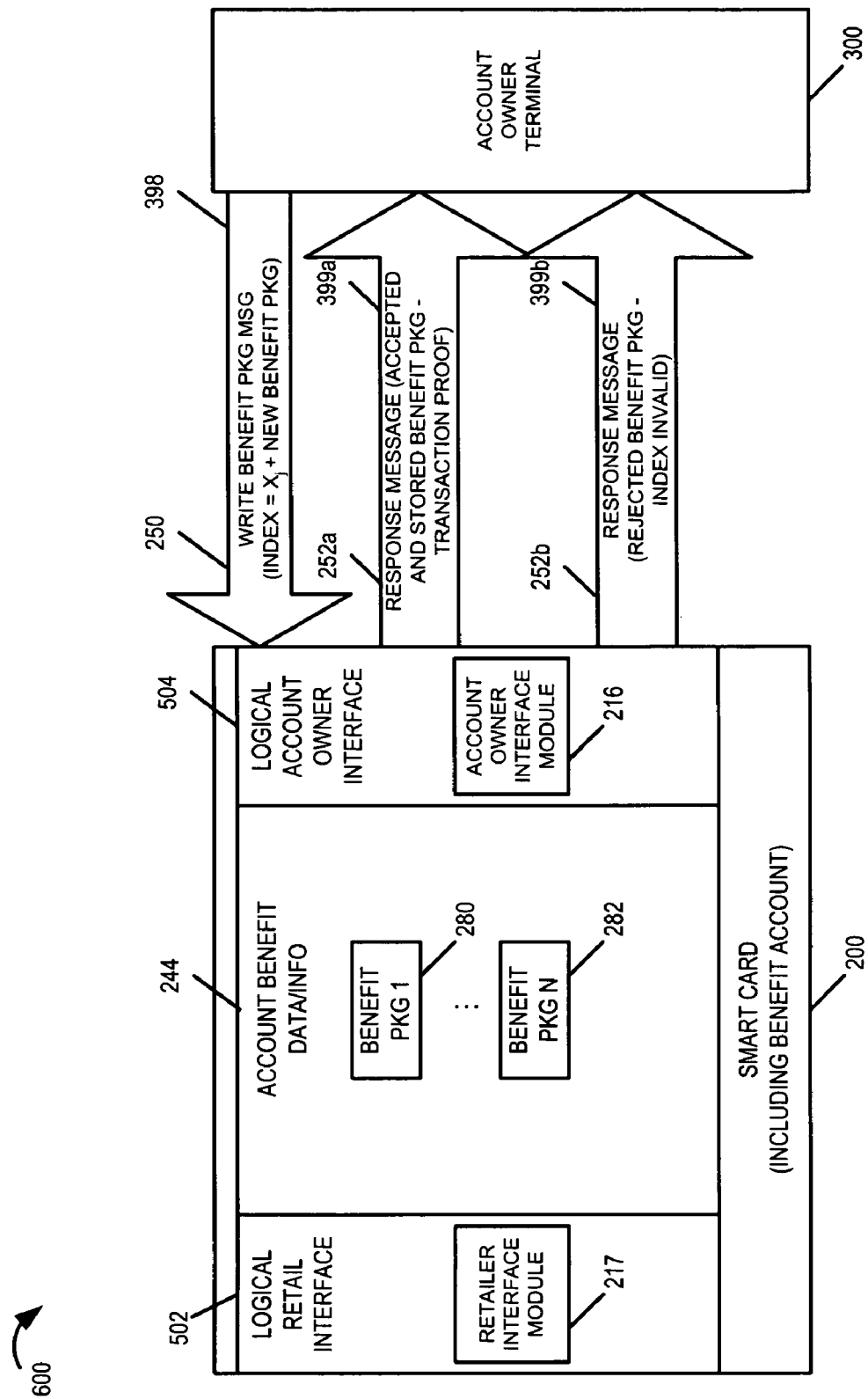
FIG. 6 is a drawing illustrating exemplary signaling which occurs during the process of writing a benefit package by an account owner terminal, in accordance with methods of the present invention.

FIG. 6 is a drawing 600 illustrating exemplary signaling in a write of a benefit package by an account owner terminal 300, in accordance with methods of the present invention. FIG. 6 illustrates exemplary signaling as an account owner terminal 300 attempts to write a new benefit package on smart card 200. The account owner terminal 300 generates and sends a write benefits package message 398 including an index $X_j$ to use and a new benefit package set of information, which is received by smart card 200 through logical account owner interface 504 as message 250. The account owner interface module 216 checks if the specified index $X_j$ is acceptable, e.g., is within the range of indexes allowable on smart card 200. If the index is acceptable, the new benefit package is stored in info 244 using index $X_j$; then affirmative response message 252*a* is sent to the account owner terminal 300 providing a transaction proof indicating that the new benefit package has been accepted and stored on smart card 200. Message 252*a* is received by account owner terminal 300 as message 399*a*. However, if the index $X_j$, requested is not considered acceptable, then an index invalid response message 252*b* is generated by module 216 and sent to the account owner terminal 300, where it is received as message 399*b*. Account owner interface module 216 may also consider other rejection criteria, e.g., the formatting of the new benefit package information, reasonableness ranges of item identification numbers, reasonableness ranges of specified item benefit quantities, etc. In accordance with the present invention, the new benefit package is either accepted and stored in its entirety as a block or rejected with no storage. In addition, in some but not necessarily all embodiments, the logical account owner interface does not permit updates to individual elements within a stored benefit package by the account owner terminal 300. However, in some embodiments, an entire stored benefit package may be overwritten.

Figure 7:
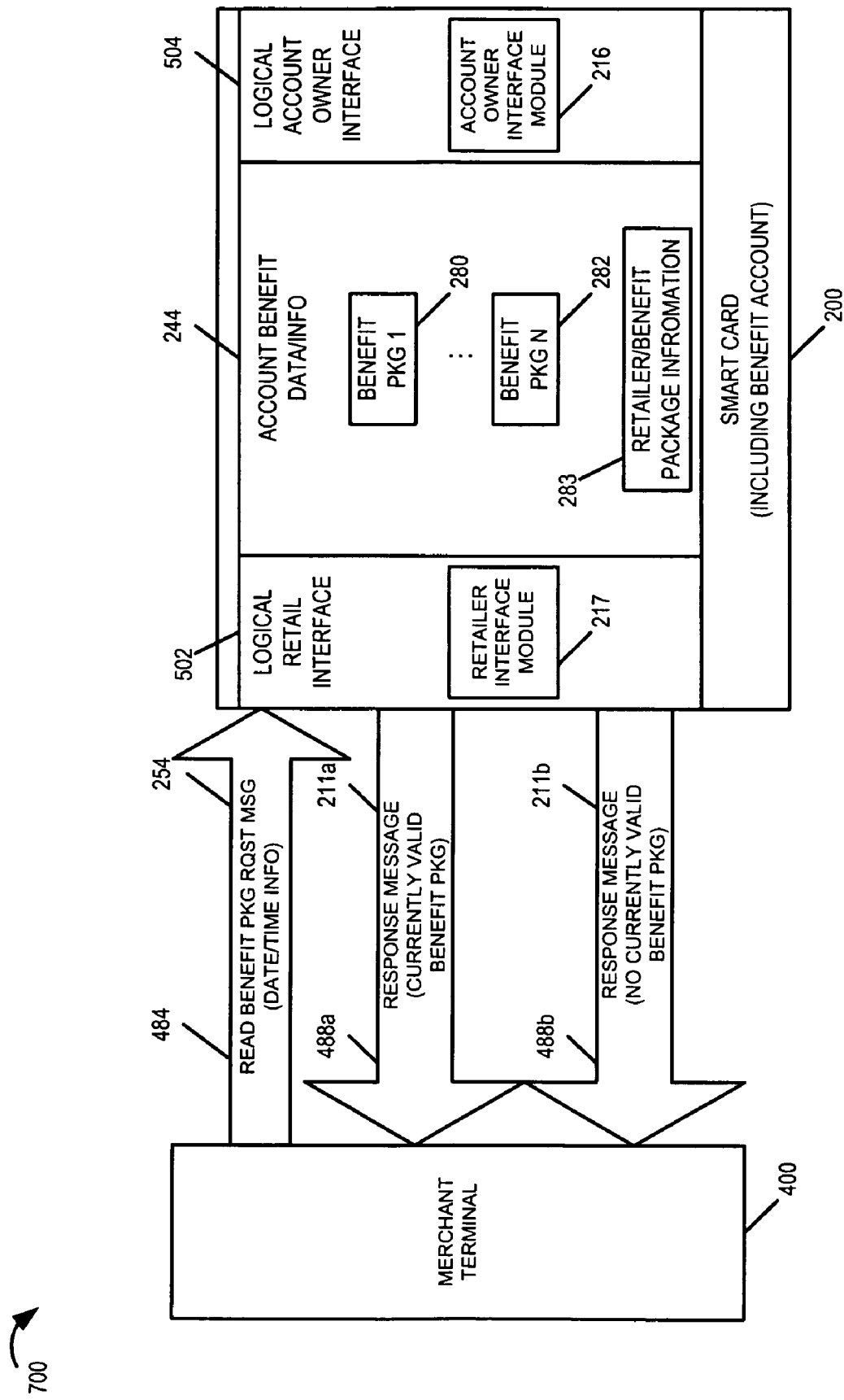
FIG. 7 is a drawing illustrating exemplary signaling during a read operation in which a benefit package is read by a merchant terminal, in accordance with methods of the present invention.

FIG. 7 is a drawing 700 illustrating exemplary signaling in a read of a benefit package from a smart card 200 by a merchant terminal 400, in accordance with methods of the present invention. The merchant terminal generates and sends a read benefits package index request message 484 including date/time information, and in some embodiments, merchant identification information. Message 484 is received by smart card 200 through logical retailer interface 502 as message 254. The retailer interface module 217 uses the received date/time information as the transaction time and searches the valid time intervals of the benefit packages (280, 282) stored on card 200. If a benefit package is found whose valid time interval includes the transaction time, the corresponding currently valid benefit package is retrieved from info 244 and forwarded in affirmative response message 211*a* to the merchant terminal where it is received as message 488*a*. However, if a benefit package meeting the time validity criteria cannot be found, then an index invalid response message 211*b* is generated by module 217 and sent to the merchant terminal 400, where it is received as message 488*b*. In accordance with the present invention, the merchant terminal 400 can retrieve a currently valid benefit package, but may not retrieve other benefit packages stored on smart card 200, e.g., benefit packages which are not currently valid. The card 200 may, and sometimes does, store information 283 indicating which merchants can supply goods included in individual benefits packages. The returned benefit package information may be limited by the card 200 to benefit packages including one or more items which can be supplied by the merchant sending the request message.

Figure 8:
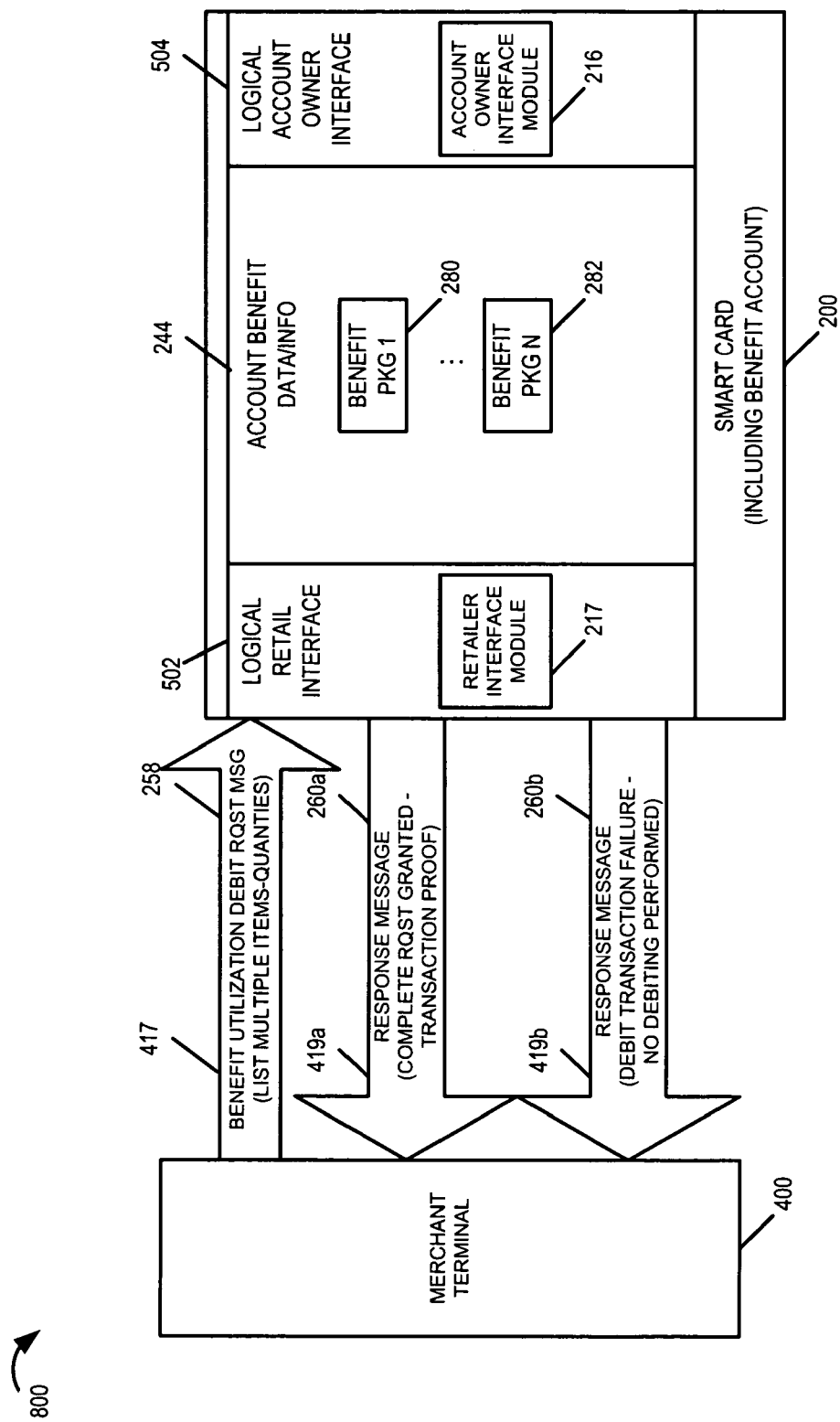
FIG. 8 is a drawing illustrating exemplary signaling which occurs as part of the process of debiting of a benefit package in response to signals from a merchant terminal, in accordance with methods of the present invention.

FIG. 8 is a drawing 800 illustrating exemplary signaling in a requested debiting of a benefit package by a merchant terminal 400, in accordance with methods of the present invention. In accordance with the methods of the present invention, the method of debiting may not be initiated unless the merchant terminal 400 has successfully completed the operations of FIG. 7 and retrieved a currently valid benefit package. FIG. 8 illustrates exemplary signaling as a merchant terminal 400 attempts to debit benefits from a debit package on smart card 200. The merchant terminal 400 generates and sends a benefit utilization debit request message 417 including a list of items to be debited and corresponding quantities to be debited for each item. In accordance with the present invention, the list may include information corresponding to multiple items. The merchant terminal 400 should construct the debit request list to specify relevant benefits and so as not to exceed the allocated benefits remaining in the currently valid benefit package, which it has received. Message 417 is received by smart card 200 through logical retailer interface 502 as message 258. The retailer interface module 217 checks if the entire set of requested benefits to be debited can be granted. If the entire request can be fulfilled, then the retailer interface module 217 decrements the quantities in the currently valid benefit package by the requested amounts. An affirmative response message 260a is then sent to the merchant terminal 400 providing a transaction proof indicating that the complete request of debiting has been granted and successfully completed. Message 260a is received by merchant terminal 400 as message 419a. However, if for any reason the entire requested debiting list cannot be granted, e.g., one item's requested amount exceeds the remaining quantity stored in the currently valid benefit package, the retailer interface module 217 rejects the entire request and does not change any of the values in the currently valid stored benefit package. Then a debit transaction failure response message 260b is generated by module 217 and sent to the merchant terminal 400, where it is received as message 419b. In accordance with the present invention, the merchant terminal 400 is restricted from incrementing any quantity information stored in a benefit package on the smart card 200.

Figure 9:
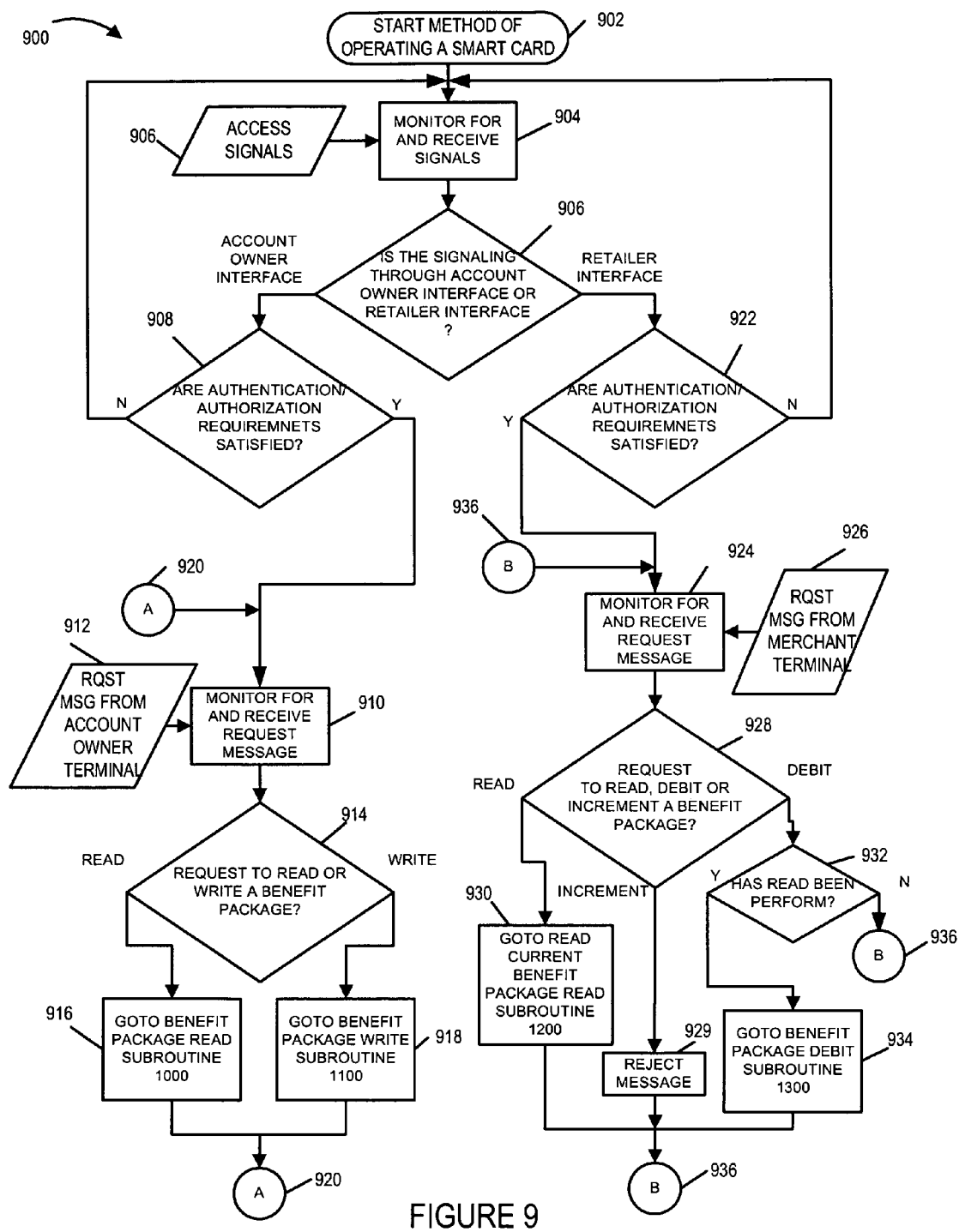
FIG. 9 is a flowchart of an exemplary method of operating a smart card in accordance with the present invention.

FIG. 9 is a flowchart 900 of an exemplary method of operating a smart card in accordance with the present invention. The smart card may be smart card 200 of FIG. 2 used in system 100 of FIG. 1 which interfaces with account owner terminals 300 of FIG. 3 and merchant terminals 400 of FIG. 4.

Operations start in step 902, where the smart card is interfaced to either an account owner terminal or a merchant terminal. It is assumed that the smart card has been previously initialized, e.g., formatted to accommodate the account benefit package structure, loaded with modules facilitating a account owner interface and a retailer interface, loaded with account holder specific authentication/authorization information.

In step 902, the smart card becomes activated, e.g., through power and/or a signal received from the interfacing terminal to which the card has been coupled. Operation proceeds from step 902 to step 904.

In step 904, the smart card monitors and receives access signals 906. The access signals 906 could be either from an account owner terminal through the account owner interface or from a merchant terminal through the retailer interface. In some embodiments, the two different interfaces may use different physical interfaces, e.g., connectors, pin assignments, etc. In some embodiments, the two interfaces may use the same physical interface, but use different protocols, baud rates, handshaking sequences, and/or authentication/authorization security methods. In some embodiments, different time windows are allocated to entering each interface. Consider, for example, that in some embodiments the account owner interface may only be accessed if a specific handshaking sequence is performed during a specified time window from power on, e.g., the first 60 seconds. At other times with reference to power on, only the retailer interface may be entered. Various combinations and variations of the interface implementations are possible in accordance with the present invention. Operation proceeds from step 904 to step 906.

In step 906, the smart card determines whether the received signaling is through the account owner interface or the retailer interface. If the received signaling is through the account owner interface, operation proceeds to step 908, where a check is performed as to whether the authentication/authorization requirements for the account owner interface are satisfied. If the requirements are not satisfied, operation returns to step 904, where smart card 200 monitors for additional access signals; however, if the requirements are satisfied, operation proceeds to step 910.

Returning to step 906, if the received signaling is determined to be through the retailer interface, the operation proceeds to step 922. In step 922 a check is performed as to whether the authentication/authorization requirements for the retailer interface are satisfied. If the requirements are not satisfied, operation returns to step 904, where smart card 200 monitors for additional access signals; however, if the requirements are satisfied, operation proceeds to step 924. In accordance with the invention, the security requirements including authentication and authorization are typically different between the account owner interface and the retailer interface. In some embodiments, the security procedures used for access via the account owner interface provide a higher level of security than the security procedures used for the retailer interface.

Returning to step 910, in step 910 the smart card is operated to monitor and receive request messages from an account owner terminal 912. Operation proceeds from step 910 to step 914 based upon a received message. In step 914, the smart card is operated to determine whether the received request message is a read request used to read a benefit package from smart card 200, e.g., a previously stored benefit package which has been debited through debit transactions with a merchant terminal, or whether the received request message is a write request to write a benefit package to smart card 200, e.g., a new benefit package which has been granted to the account holder by the account owner. If in step 914 it is determined that the request message is a read, operation proceeds to step 916, where the smart card performs a call to benefit package read subroutine 1000. If step 914 determines that the request message is a write, operation proceeds to step 918, where the smart card performs a call to benefit package write subroutine 1100. It should be noted that the smart card normally performs read and writes of benefit packages as sets of information through account owner interface and, in most embodiments, does not modify individual benefit items or benefit item values to make adjustments on an item-by-item basis through the account owner interface. In some embodiments, an entire benefit package may be overwritten through the account owner interface. Operation proceeds from either step 916 or step 918 through connecting node A 920 to step 910, where the smart card is operated to monitor for additional request messages through the account owner interface. Operations can be terminated if the smart card does not receive any additional messages through the account owner interface after a specified amount of time (time-out), the smart card receives a termination message from the account owner terminal, and/or the card is removed from being coupled to the account owner terminal, e.g., loss of power and/or loss of an activation signal.

Returning to step 924, in step 924 the smart card is operated to monitor and receive request messages from an account owner terminal 926. Operation proceeds from step 924 to step 928 based upon a received message. In step 928, the smart card is operated to determine whether the received request message is a read request to read a benefit package from smart card 200, or whether the received request message is a debit request to debit benefits from the currently valid benefit package on smart card 200. Messages from merchant terminals attempting to increment benefits will be rejected in step 929 and are not processed further. However, if step 928 determines that the request message is a read, operation proceeds to step 930, where the smart card makes a call to a read current benefit package subroutine 1200. If step 928 determines that the request message is a debit request, operation proceeds to step 932, where the smart card is operated to check as to whether a benefit package read operation has been previously successfully performed during this on cycle as required in various implementations as part of a benefits transaction. If the read operation was successfully performed, then operation proceeds to step 934, where the smart card performs a call to a benefit package debit subroutine 1300. If the read operation was not successfully performed indicating some error in the normal processing sequence, then access to benefit packing debiting is denied, and operation proceeds via connecting node B 936 to step 924, where additional monitoring for request messages via the retailer interface is performed. Operation also proceeds from either step 930 or step 934 via connecting node B 936 to step 924 for additional monitoring of request messages.

Operations can be terminated if the smart card does not receive any additional messages through the retailer interface after a specified amount of time (time-out), the smart card receives a termination message from the merchant terminal, and/or the card is removed from being coupled to the merchant terminal, e.g., loss of power and/or loss of an activation signal.

Figure 10:
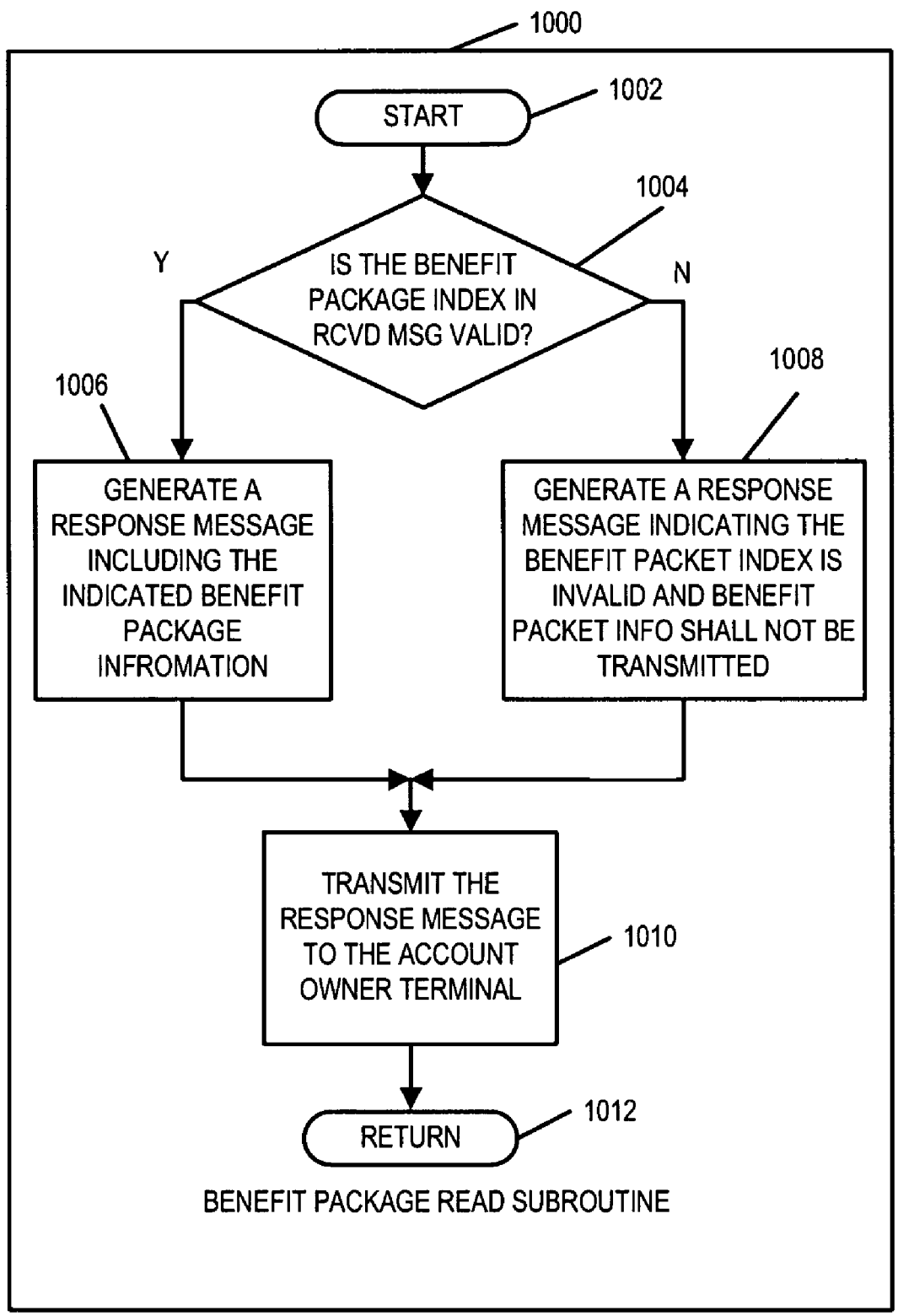
FIG. 10 is a flowchart of an exemplary benefit package read subroutine in accordance with methods of the present invention.

FIG. 10 is a flowchart of an exemplary benefit package read subroutine 1000 used by the smart card when interacting via the account owner interface with an account owner terminal. FIG. 5 is also illustrative of the method shown in FIG. 10. Operation starts in start step 1002, when subroutine 1000 is called and proceeds to step 1004. In step 1004 a check is made as to whether the benefit package index in the received message is valid. If it is determined in step 1004 that the index is valid, then operation proceeds to step 1006, where the smart card is operated to generate a response message including the indicated benefit package information corresponding to the requested index. However, if it is determined in step 1004 that the requested index is invalid, then operation proceeds to step 1008, where the smart card is operated to generate a response message indicating that the benefit package index is invalid and no benefit package information shall be transmitted. Operation proceeds from step 1006 or 1008 to step 1010, where the smart card is operated to transmit the generated response message to the account owner terminal. Operation proceeds from step 1010 to return step 1012, where operation is returned to the main routine.

Figure 11:
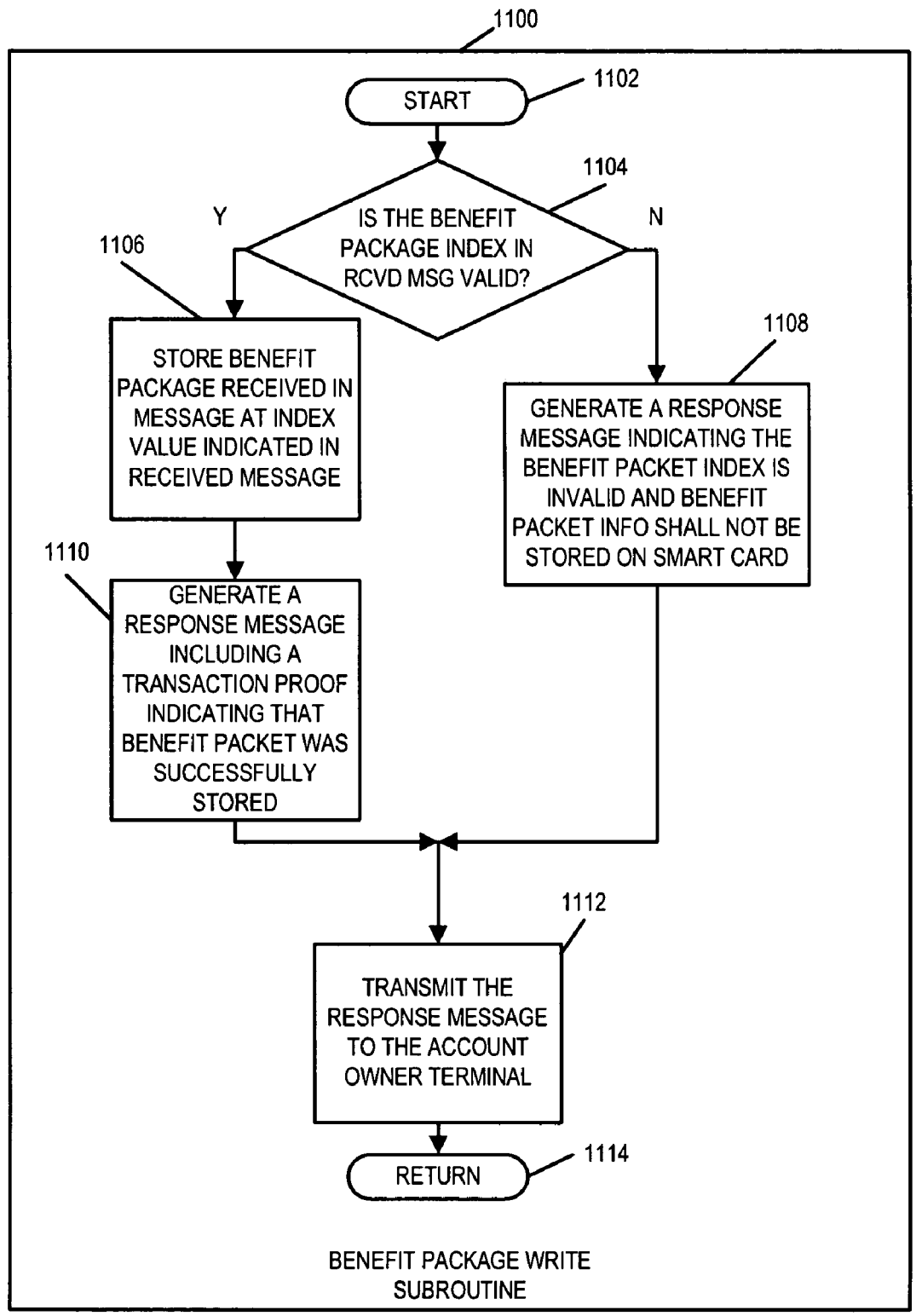
FIG. 11 is a flowchart of an exemplary benefit package write subroutine in accordance with methods of the present invention.

FIG. 11 is a flowchart of an exemplary benefit package write subroutine 1100 used by the smart card when interacting via the account owner interface with an account owner terminal. FIG. 6 is also illustrative of the method shown in FIG. 11. Operation starts in start step 1102 when subroutine 1100 is called. Operation proceeds from start step 1102 to step 1104. In step 1104 a check is made as to whether the benefit package index in the received message is valid. If it is determined in step 1104 that the index is valid, then operation proceeds to step 1106, where the smart card is operated to store the benefit package information received in the request message at the index value indicated in the received request message. Operation proceeds from step 1106 to step 1110, where the smart card is operated to generate a response message including a transaction proof indicating that the benefit package was successfully stored on the smart card. Returning to step 1104, if it is determined in step 1104 that the requested index is invalid, then operation proceeds to step 1108, where the smart card is operated to generate a response message indicating that the benefit package index is invalid and benefit package information shall not be stored on the smart card. Operation proceeds from step 1110 or 1108 to step 1112, where the smart card is operated to transmit the generated response message to the account owner terminal. Operation proceeds from step 1112 to return step 1114, where operation is returned to the main routine.

Figure 12:
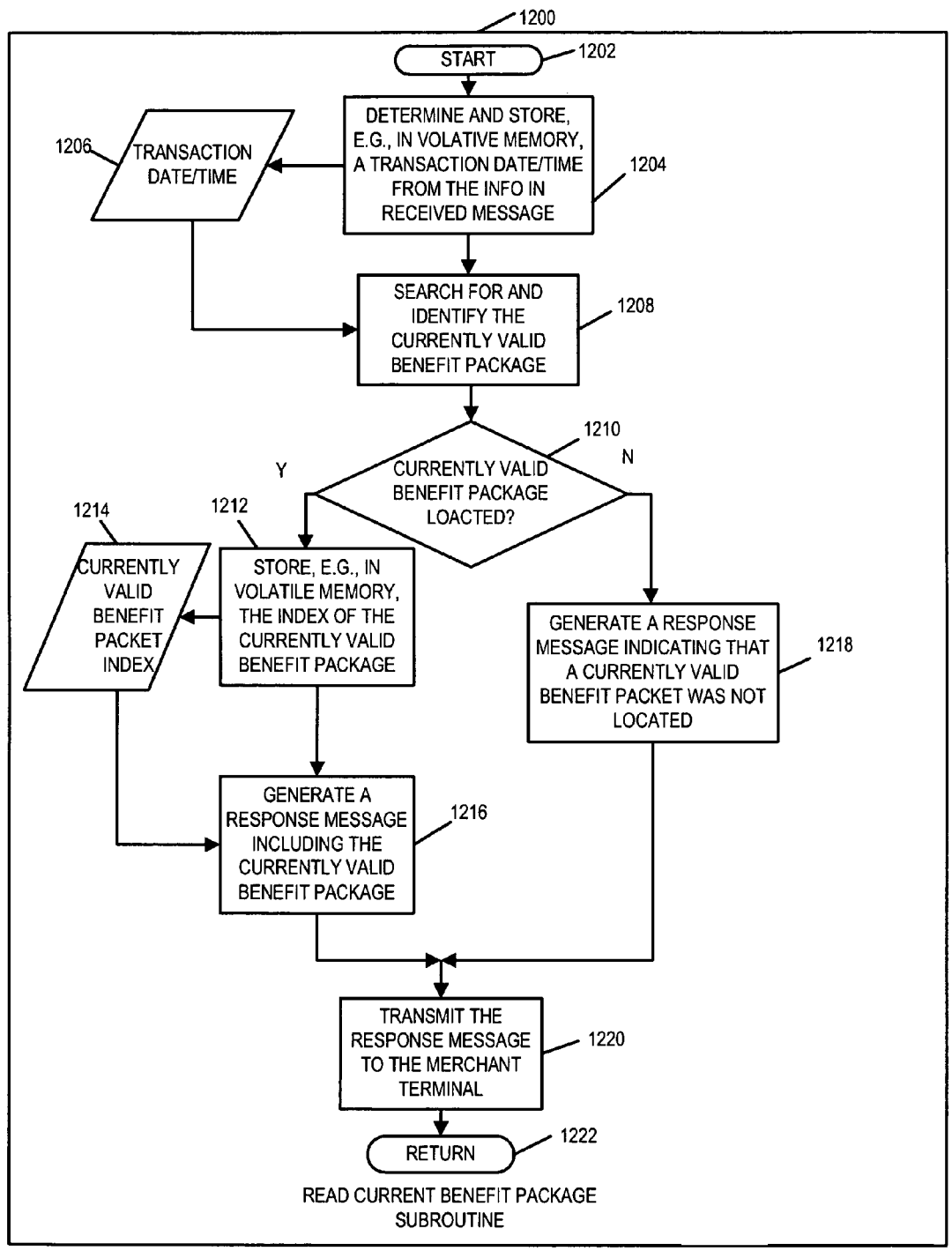
FIG. 12 is a flowchart of an exemplary read current benefit package subroutine in accordance with methods of the present invention.

FIG. 12 is a flowchart of an exemplary read current benefit package subroutine 1200 used by the smart card when interacting via the retailer interface with a merchant terminal. FIG. 7 is also illustrative of the method shown in FIG. 12. Operation starts in start step 1202 when subroutine 1200 is called. Operation proceeds from start step 1202 to step 1204. In step 1204 the smart card is operated to determine and store, e.g., in volatile memory, a transaction date/time 1206 obtained from the information in the received message. Operation proceeds from step 1204 to step 1208. In step 1208, the smart card searches for and identifies the currently valid benefit package. The smart card determines valid benefit package ranges for its stored benefit packages, and attempts to find a range which includes transaction date/time 1206. Operational flow is determined in step 1210 based upon the result of the search in step 1208. If a match is found, the corresponding stored benefit package is designated the currently valid benefit package, and operation proceeds from step 1210 to step 1212. In step 1212, the smart card stores, e.g., in volatile memory, the index of the currently valid benefit package 1214. Operation proceeds from step 1212 to step 1216, in which the smart card is operated to generate a response message including the currently valid benefit package as designated by stored index 1214.

Returning to step 1210, if the search of step 1208 could not find a currently valid benefit package, then operation proceeds from step 1210 to step 1218, where the smart card generates a response message indicating that a currently valid benefit package was not located. Operation proceeds from either step 1216 or 1218 to step 1220, where the smart card is operated to transmit the response message to the merchant terminal. Operation proceeds from step 1220 to return step 1222, where operation is returned to the main routine.

It should be noted that the read current benefit package subroutine 1200 restricts the merchant terminal to viewing the currently valid benefit packages based on submitted data/time tag information. In some embodiments, e.g., where the smart card includes a clock module and a battery, the smart card maintains an independent time reference, to verify the merchant terminal data/time information for reasonableness. In addition, in some embodiments, retailer identification information received from the retail terminal is considered in the search to identify a currently valid benefit package and only benefit packages including benefit items known to the device to be supplied by the identified retailer, e.g., from stored information in the device, will be considered as possible valid benefit packages.

Figure 13:
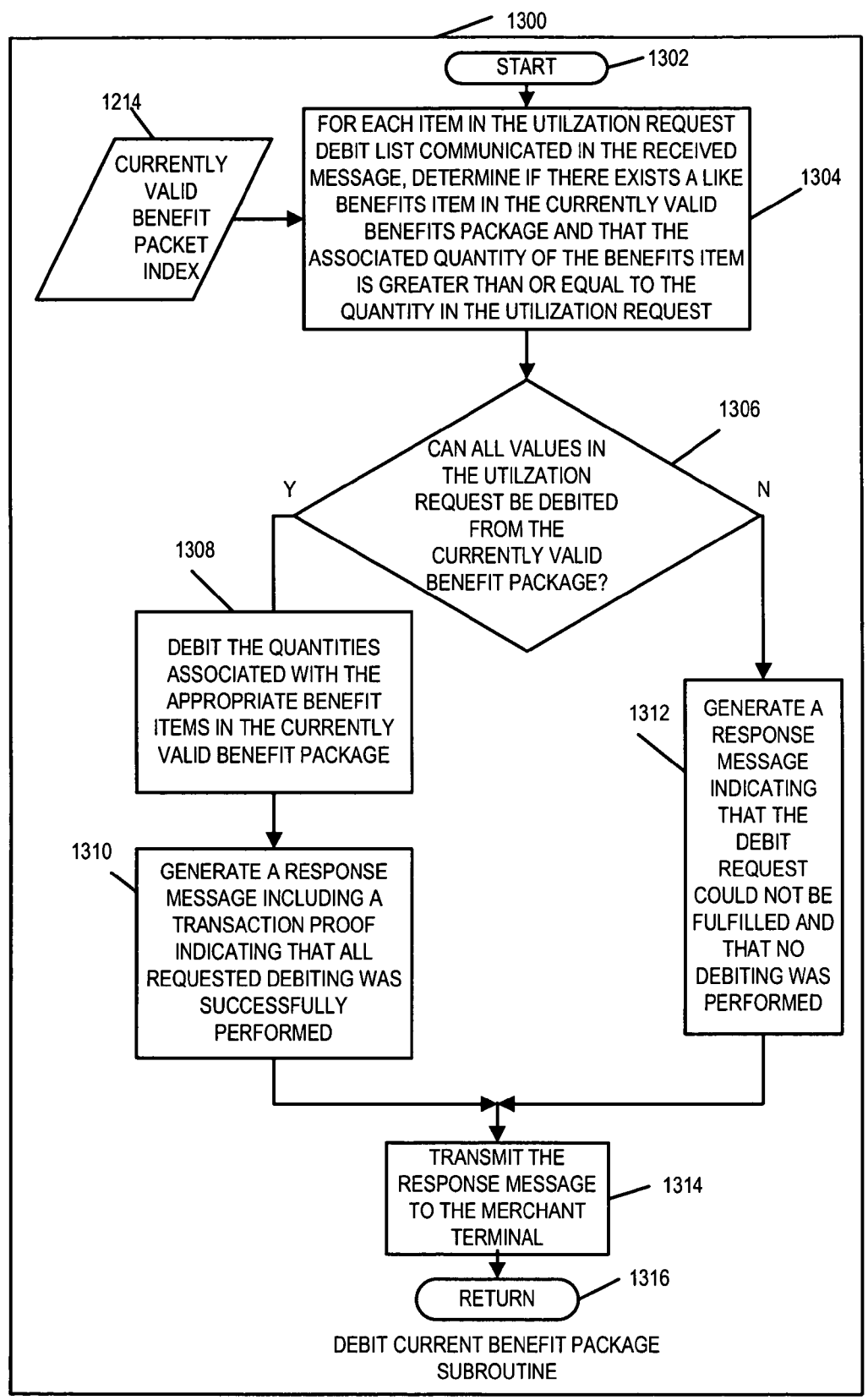
FIG. 13 is a flowchart of an exemplary debit current benefit package subroutine in accordance with methods of the present invention.

FIG. 13 is a flowchart of an exemplary debit current benefit package subroutine 1300 used by the smart card when interacting via the retailer interface with a merchant terminal. FIG. 8 is also illustrative of the method shown in FIG. 13. Operation starts in start step 1302 when subroutine 1300 is called and proceeds to step 1304. In step 1304 for each item in the utilization request debit list communicated in the received message, the smart card determines if there exists a like benefits item in the currently valid benefits package and that the associated quantity of the benefits item is greater than or equal to the quantity in the utilization request. The stored currently valid benefit packet index 1214 obtained previously in step 1212 is used to identify the currently valid benefits package. Operation proceeds from step 1304 to step 1306. In step 1306, the smart card checks as to whether all values in the utilization request can be successfully debited from the currently valid benefit package. In accordance with the method of the present invention, debiting is done on a transaction basis, e.g., with entire update transaction being completed or rejected. Thus, either the complete debit request list submitted can and is fulfilled or no debiting occurs. If all debiting requests can be fulfilled, then operation proceeds from step 1306 to step 1308, where the smart card is operated to debit the quantities associated with the appropriate benefit items in the currently valid benefit package. Operation proceeds from step 1308 to step 1310. In step 1310, the smart card generates a response message including a transaction proof indicating that all requested debiting was successfully performed.

Returning to step 1306, if any of the requested debiting could not be performed, for whatever reason, e.g., one or more requested items was not designated within currently valid benefit package, one or more requested debiting amounts exceeds the amount available in currently valid benefit package, or one or more requested quantities uses units which do not match units in currently valid benefit package, then operation proceeds to step 1312. In step 1312, the smart card is operated to generate a response message indicating that the debit request could not be fulfilled and that no debiting was performed. Operation proceeds from either step 1310 or step 1312 to step 1314. In step 1314, the smart card is operated to transmit the response message to the merchant terminal. Operation proceeds from step 1314 to return step 1316, where operation is returned to the main routine.

It should be noted that in various embodiments subroutine 1300 cannot be entered unless subroutine 1200 has been successfully completed resulting in the transmission of a currently valid benefit package to the merchant terminal which the merchant terminal is expected to use to formulate a proper debit transaction request message. It is the responsibility of the merchant terminal to submit a debiting request list in the proper format, the debiting list matching or being a subset of the items and quantities available in the currently valid benefit package.

Figure 14:
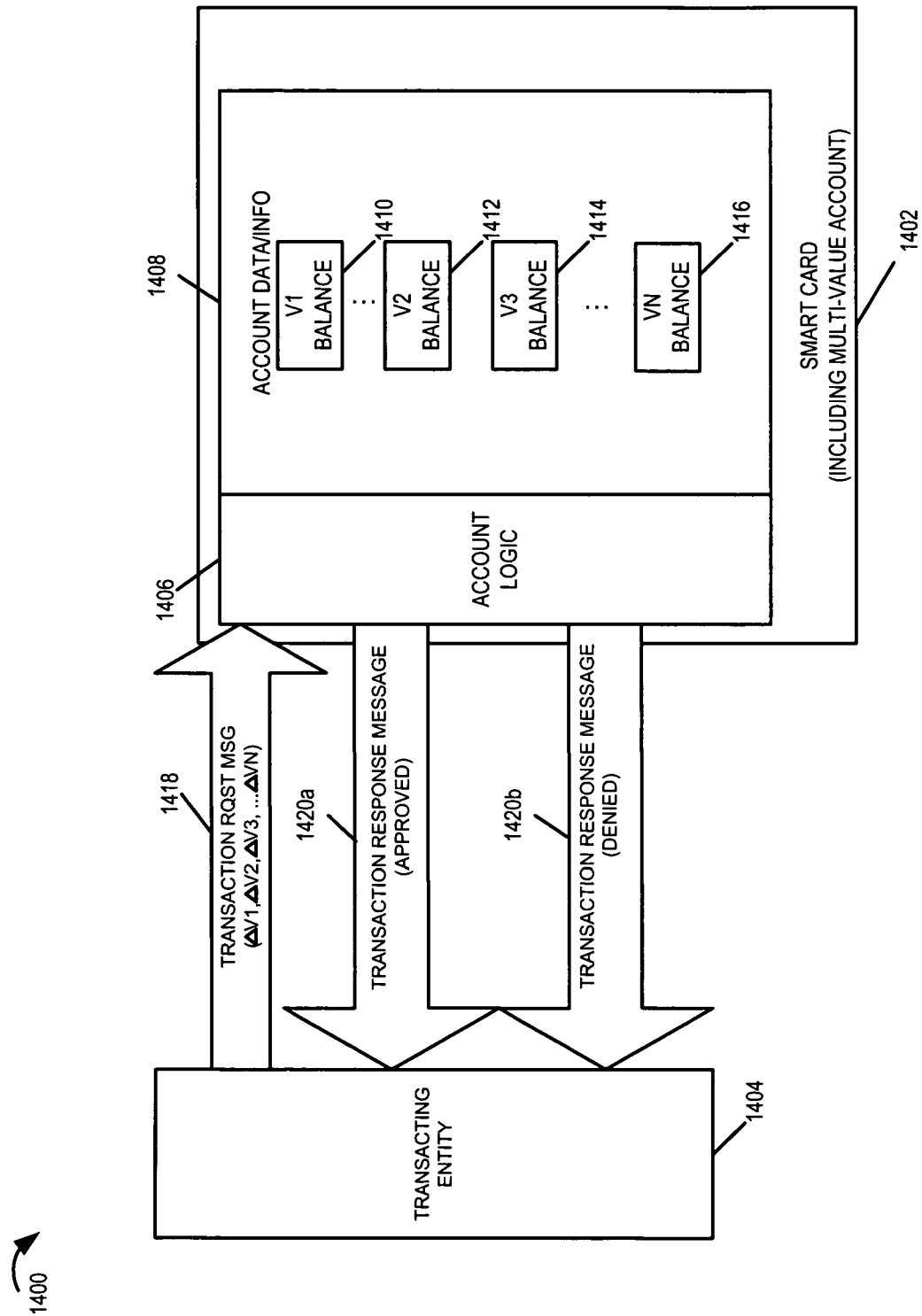
FIG. 14 is a drawing illustrating a feature of the invention, where multi-value account transactions are performed as a unit process.

FIG. 14 is a drawing 1400 illustrating a feature of the invention, where multi-value account transactions can be performed as a unit process. Drawing 1400 includes a portable electronic data storage/processing device, e.g., smart card, 1402 including a multi-value account, and a transacting entity 1404 interfacing with the smart card 1002. Smart card 1402 includes account data/information 1408 including a plurality of account non-monetary data value balances (V1 1410, V2 1412, V3 1414, . . . VN 1416). Smart card 1402 also includes account logic 1406, implemented in accordance with the present invention.

In this exemplary embodiment, the account on smart card 1402 maintains two or more values (1410, 1412, 1414, 1416) with which a transaction can be performed. The number of values maintained in the account, the logic implemented to approve or deny transactions, and any prerequisite security constraints are defined by the "account owner" or the entity establishing the system in which the account is maintained.

This exemplary embodiment includes apparatus and methods where an account that maintains two or more separate values can be transacted by causing one or more of those values to be debited or credited. The values included in the account can represent non-monetary values as defined by the account owner.

This account structure and account logic, in accordance with the present invention, allows a number (N) of values (V), as defined by the account owner, to be managed by the account logic 1406. Transactions with the account can affect any number of its account values (V1, . . . VN) in one single or unit transaction. This method is in contrast to the known approach, where a number of separate traditional single value accounts are established. In the traditional account structure implementation using multiple single value accounts, in order to change multiple values, a separate transaction is needed for each value change. The method of the present invention reduces the number of transaction that need to be performed at a given time to one transaction, no matter how many individual values are affected in the account.

Another advantage of this embodiment of the present invention is that the adjustments to the account balances are performed on the smart card 1402 by the accounting logic 1406. This eliminates the security issues that result in an approach where one moves the data representing the accounts' values to another device, e.g., the transacting entity, where the values can be changed, and then the values are moved back to the device storing the account information. This embodiment of the present invention assumes that the account is maintained on a computing device, e.g., smart card 1402, capable of storing the account values and implementing logic that allows transactions to be approved or denied by the account logic itself. This allows decisions affecting the account values to be consolidated into the account logic 1406, eliminating the security and trust issues of simply maintaining the account on a data-storage device.

Account logic 1406 accepts transaction request 1418 affecting any number of the account values from external transacting entity 1404. Account logic 1406 may be implemented as part of a retailer and/or account owner interface that may be implemented as one or more routines executed by a processor.

In FIG. 14, the transaction request 1418 is shown as including $\Delta V1, \Delta V2, \Delta V3, \ldots, \Delta VN$. However, it is to be understood that any of the other possible combinations of different values are possible, e.g. single value change requests, e.g., ($\Delta V2$), double value requests, e.g., ($\Delta V1, \Delta V3$), three value change requests, e.g., ($\Delta V1, \Delta V2, \Delta VN$), and so on, for a transaction request message 1418 in accordance with the present invention. In general, each of the requested delta values may be positive or negative. However, in some embodiments, the delta values may be restricted, e.g., such that only debits transactions are allowed with a transacting entity 1404.

Account logic 1406 also evaluates, e.g., based upon account owner criteria, whether each of the account value deltas received in the transaction request can be authorized. Then if account logic 1406 determines that all the requested deltas can be applied to the account balances, e.g. based upon the rules set by the account owner, the account logic 1406 adjusts the account balances associated with each of the received deltas in message 1418, and the account logic 1406 sends a response 1420a to the transacting entity 1404 indicating that the transaction has been approved and occurred successfully. However, in accordance with the present invention, if one or more of the requested deltas in message 1418 cannot be applied to the account values, then the transaction request fails, none of the value balances in the account are changed, and a response 1420b is returned to the transacting entity 1404 indicating that the transaction request has been denied and failed. In accordance, with the present invention, the change request 1418 is treated by the accounting logic 1406 using an all or nothing approach, either all requested deltas are granted as a block or none of the requested deltas are granted.

One application of the invention is the benefit package embodiment previously described. Smart card 1402 may be smart card 200 of FIG. 2, the transacting entity 1404 may be merchant terminal 400 of FIG. 4, account data/info 1408 may be benefit package data/info 280, value balance 1 1410 may be quantity info 296, value balance N 1416 may be the quantity info corresponding to benefit item N 292, account logic 1406 may be retailer interface module 217, transaction request message 1418 may be message (417/258), affirmative transaction response message 1420a may be response message (260a/419a), and denial transaction response message 1420b may be response message (260b/419b). In such embodiments, the account logic 1406 includes rules that allow debiting requests to be considered, but does not allow crediting requests to be considered.

Other embodiments of the present invention allow crediting and not debiting. Still other embodiments, allow both crediting and debiting. In some embodiments, different rules may be used by the account logic 1406 depending on the transaction entity, e.g., some transactions devices may be allowed debiting but not crediting, while other devices may be allowed debiting and crediting.

Embodiments of the present invention, as described with respect to FIG. 14 could be used for government benefit programs and/or private sector programs, e.g., loyalty schemes, where multiple values are maintained. One such example is an airline frequent flyer program where multiple values representing basis miles flown, premium miles flown, upgrade credits, movie vouchers, meal vouchers, hotel vouchers, and segments flown could be maintained. In such an embodiment, a transacting entity could be an airline's check-in terminal. A check-in transaction request could involve the following deltas: a credit for basis miles to be flown on the trip, a debit for one executed upgrade to first class, a debit for a movie voucher to be used on the flight, and a credit for the number of segments to be flown on the trip. Another exemplary use of the present invention could be in a pre-paid calling account using a smart card where the account includes a connection establishment value balance, e.g., 10 calls, and a connection time value balance, e.g., 100 minutes.

Figure 15:
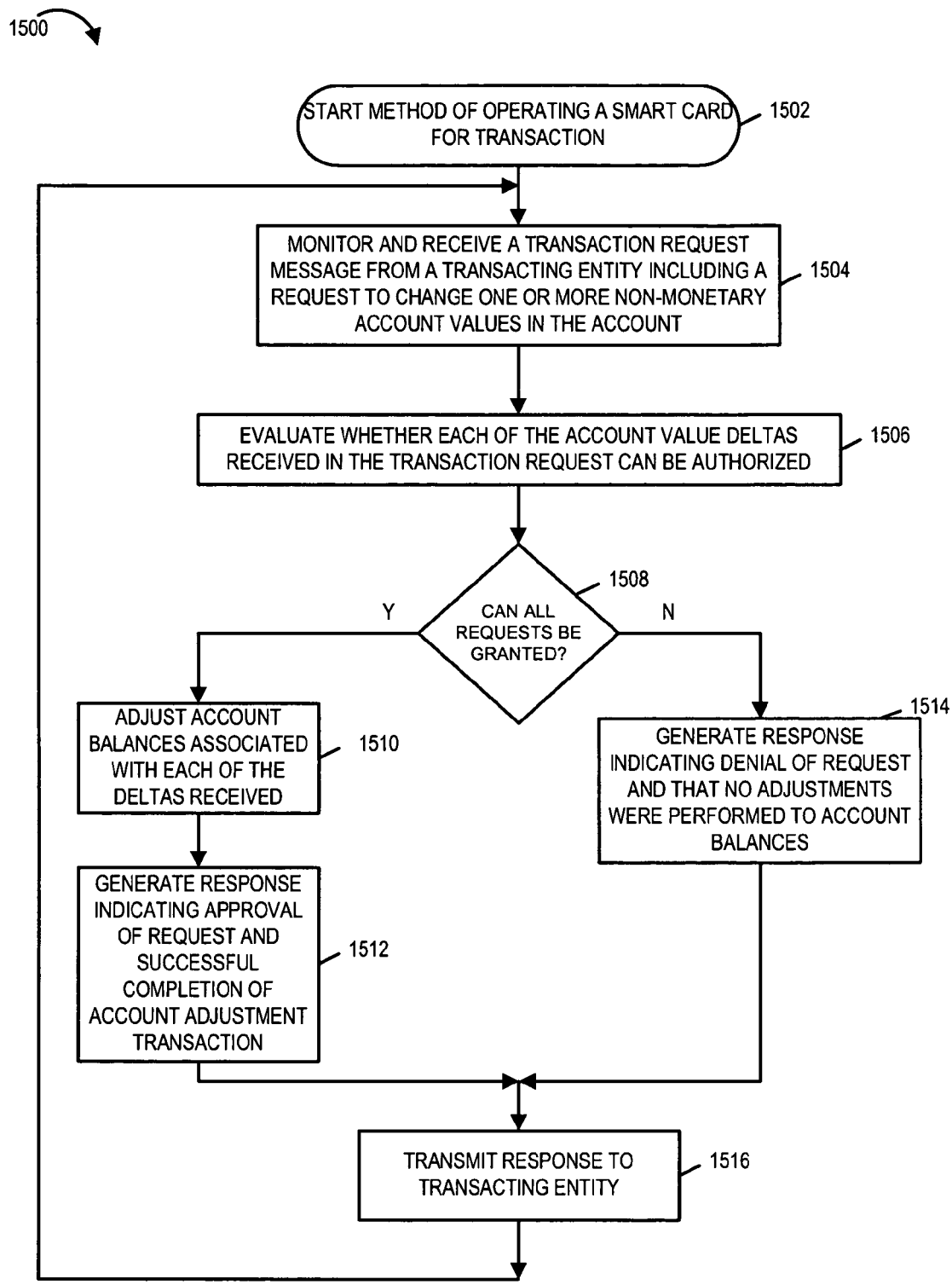
FIG. 15 is a flowchart illustrating an exemplary method of operating a portable storage/processing device, e.g., smart card, in accordance with the present invention.

FIG. 15 is a flowchart 1500 illustrating an exemplary method of operating a portable storage/processing device, e.g., smart card, in accordance with the present invention. The method of flowchart 1500 may correspond to operations of smart card 1402 in its transactions with transacting entity 1404 as shown in FIG. 14 and previously described with respect to FIG. 14.

Operation of the smart card for transactions starts in step 1502, where the smart card has been coupled to a transacting entity. This coupling may initiate an activation sequence on the smart card. Operation proceeds from step 1502 to step 1504. In step 1504, the smart card monitors and receives a transaction request message from a transaction entity, said request including a request to change one or more non-monetary account values in the account. Then, in step 1506, the smart card evaluates whether each of the account value deltas received in the transaction request can be authorized, e.g., based upon criteria established by the account owner and included in the account logic on the smart card. Operation proceeds from step 1506 to step 1508.

In step 1508, the smart card directs operational flow based upon the finding of step 1506. If all the requests can be granted, operation proceeds to step 1510; however, if any of the requests cannot be granted, then the operation proceeds to step 1514. In step 1510, the smart card is operated to adjust the account balances associated with each of the deltas received in the request message. Operation proceeds from step 1510 to step 1512. In step 1512, the smart card is operated to generate a response indicating approval of the request and successful completion of the account adjustment transaction. In step 1514, the smart card is operated to generate a response indicating that the request has been denied and that no adjustments have been performed to the account balances stored on the smart card. Operation proceeds from either step 1512 or step 1514 to step 1516, where the smart card is operated to transmit the generated response of step 1512 or 1514 to the transacting entity. Operation proceeds from step 1516 to step 1504, where the smart card is operated to monitor for additional transaction request messages.

In various embodiments operations described herein are implemented using one or more modules to perform the steps corresponding to one or more methods of the present invention, e.g., selection between interfaces, communications, authentication/authorization, benefit package reads, benefit package write, benefit package debiting, etc. In some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s), routines, or subroutines.

Various features of the present invention may be implemented in software. Such software is stored on a machine readable, e.g., the memory in the smart card or memory in the card reader/writer device. Accordingly, the present invention is directed to, among other things, a machine readable medium including computer executable instructions for controlling a device to perform one or more steps in accordance with the method of the present invention.

Numerous variations on the above described exemplary embodiments are possible while remaining within the scope of the invention. For example, while described in the exemplary context of a smart card implementation, the apparatus of the invention may be implemented as part of cell phone and/or personal data assistant which includes different interfaces, e.g., one interface for interacting with an account owner and another interface through which a merchant who provides benefits interacts with the device.

What is claimed is:

1. An apparatus for performing at least some non-financial transactions, the apparatus comprising:
   a portable information storage device including:
      a processor for executing routines used to control operation of said device; and
      a memory coupled to said processor, said memory including:
         a plurality of sets of benefit package information, each of the sets of benefit package information including: i) benefit package selection criteria data, ii) a plurality of benefit item identifiers, each benefit item identifier identifying a non-monetary item to be supplied as a benefit and iii) quantity information including a plurality of non-monetary quantity values, each non-monetary quantity value corresponding to a different benefit item identified by a benefit item identifier included in the same set of benefit package information as the corresponding non-monetary quantity value;
      an account owner interface that allows an account owner to access and modify benefit package information included in said memory, said account owner interface allowing the account owner to read benefit package information from said memory and to perform at least one of: increasing one of the non-monetary quantity values included in one of the sets of benefit package information and storing a new set of benefit package information in said memory; and
      a retailer interface, said retailer interface prohibiting a retailer from storing information on a new benefit to be provided or incrementing a stored non-momentary quantity value indicating the amount of a benefit to be provided but allowing the retailer to obtain benefit account information from said portable electronic device and to cause decrementing of non-monetary quantity values stored in said memory.

2. The apparatus of claim 1,
   wherein said portable information storage device corresponds to a beneficiary account holder; and
   wherein said benefit package selection criteria data criteria includes at least some date information used to indicate a period of time in which one of the sets of benefit package information is to be used.

3. The apparatus of claim 2, wherein said non-monetary quantity values correspond to different units of measurement for at least two different benefit items, one unit of measurement being a fluid measurement and another unit of measurement being a weight measurement.

4. The apparatus of claim 2,
   wherein said account owner interface provides a first level of security which must be satisfied prior to said account owner interface allowing an account owner to alter benefit information; and
   wherein said retailer interface provides a second level of security which must be satisfied prior to said retailer interface allowing a retail terminal to alter stored benefit information, the second level of security being lower than said first level of security.

5. The apparatus of claim 4, wherein said device includes:
   means for disabling said account owner interface for at least one predetermined period of time.

6. The apparatus of claim 5, wherein said at least one predetermined period of time is a period of time following the updating by an account owner of benefit information stored in said memory.

7. The apparatus of claim 5, wherein said at least one period of time includes all time following the completion of a communications session between an account owner terminal used to load said memory with the plurality of sets of benefit it package information.

8. The apparatus of claim 2, wherein said retailer interface includes means for approving and rejecting retail transactions on a per transaction basis.

9. The apparatus of claim 8,
   wherein said means for approving and rejecting retail transactions includes:
   means for checking that multiple non-monetary values to be decremented during a transaction with a retail terminal do not exceed corresponding non-monetary quantity values included in a set of benefit package information that is to be modified; and
   means for rejecting the transaction when a check indicates that any one of the corresponding benefit value amounts is exceeded.

10. The apparatus of claim 9, wherein said retailer interface further includes:
    means for identifying a benefit package which is valid at the time of a request for benefit package information is received from a retail terminal; and
    means for transmitting valid benefit package information to a retail terminal.

11. The apparatus of claim 10, wherein said means for identifying a benefit package which is valid only identifies benefits packages as valid if the benefit package includes at least one item identifier that identifies an item that is supplied by a retailer to which the retail terminal from which the request for benefit package information was received.

12. The apparatus of claim 11, wherein said retail interface rejects request to debit values received from a retail terminal to which a valid set of benefit package information was not previously supplied from said memory.

13. The apparatus of claim 2, wherein said memory includes authentication data that comprises biometric information that can be used by a retail terminal to verify the identity of the account holder to whom benefits may be provided.

14. The apparatus of claim 1,
    wherein at least one set of said benefit package information includes a number of food items that may be obtained as a granted benefit from a retailer that can access said portable storage device via a retail terminal interacting with said portable storage device via said retailer interface; and wherein said at least one set of said benefit package information includes at least two different benefit item identifiers corresponding to different food benefits and benefit quantity information for each of the at least two different food groups.

15. The apparatus of claim 14, wherein the benefit quantity information for each of the at least two different food groups are stored as a quantity values corresponding to different units of measurement.

16. The apparatus of claim 14, wherein the portable information storage device includes means for decrementing the benefit quantity information for each of said at least two different food groups in a single transaction.

17. The apparatus of claim 16, wherein said portable electronic storage device is a smart card.

18. The apparatus of claim 1, wherein said apparatus is part of a system, the system further comprising:
  additional portable information storage devices, each one of said additional portable information storage devices corresponding to a different benefit program beneficiary;
  a plurality of account owner terminals for loading benefit information onto one or more of said portable information storage device and said additional portable information storage devices by interacting with said devices through the account owner interface included in each of said portable information storage devices with which the account owner terminal interacts; and
  a plurality of retailer terminals for retrieving benefit information from one or more of said portable information storage devices and requesting debiting of benefit information through the retail terminal interface included in each of said portable information storage devices with which the retailer terminal interacts; and
  wherein the number of retailer terminals in said system is at least 20 times the number of account owner terminals in said system.

19. The system of claim 18,
  wherein each account owner terminal in said system is located in an account owner office; and
  wherein each retailer terminal in said system is located on the premises of a retail establishment authorized to provide benefits in accordance with a government sponsored benefit program.

20. A method of implementing a benefit program including at least some non-monetary benefits, the method comprising:
  providing a plurality of portable information storage devices to beneficiaries of said benefit program;
  storing on the portable information storage device provided to a particular program beneficiary benefit information indicating the types and amounts of non-monetary benefits to be provided to the particular beneficiary;
  operating the portable information storage device to provide said benefit information to a retail terminal through which benefits can be provided;
  operating the portable information storage device to approve or disapprove a benefit grant transactions on a per transaction basis, each benefit transaction grant requested by a retail terminal that involves modifying multiple benefit amounts corresponding to different items which are to be provided as a benefit to said particular program beneficiary being disapproved in its entirety if the amount of any one of a plurality of items to be provided exceeds the benefit amount available for the corresponding one of the items to be provided.

21. The method of claim 20, wherein said method includes restricting retail terminals from incrementing any benefit amounts stored on said portable information storage devices.

22. The method of claim 21, wherein said method includes restricting incrementing of benefit amounts or adding of new benefits to the information stored on the portable information storage device to terminals owned by a beneficiary program owner.

23. The method of claim 22,
  wherein said beneficiary program owner is a government; and
  wherein the method includes limiting beneficiary program owner terminals to being located in government offices; and
  wherein the number of beneficiary program owner terminals is limited to be a fraction which is less than $\frac{1}{10}^{th}$ of the number of retail terminals.

24. The method of claim 22, where providing a plurality of portable information storage devices includes providing each portable information storage device with:
  a beneficiary program owner interface used for interacting with beneficiary owner terminals and for allowing benefit amount information to be incremented or added; and
  a retail terminal interface used for interacting with retail terminals and for limiting retail terminals to benefit amount changes which decrement the amount of benefits indicated by information stored in said portable information storage devices.

25. A method of performing a non-financial transaction using a portable electronic storage device including a microprocessor, the method comprising:
  storing in said portable electronic storage device at least two benefit data sets related to a benefit account owner, wherein each benefit data set comprises benefit value data;
  accessing said portable electronic storage device during a single non-financial transaction at a retail location, wherein said access is controlled by said storage device's microprocessor;
  modifying the value of said at least two benefits value data during said single non-financial transaction; and
  wherein said microprocessor approves and disapproves transactions on a per transaction basis, said modifying being performed only after approval of said transaction by said microprocessor, said microprocessor checking the amounts of benefits being provided against the authorized benefit amount indicated by said benefit value data prior to approving a transaction.

26. The method of claim 25,
  where said storing step further includes storing selection criteria relating to said benefit data sets and wherein said modifying step is only performed if the requested modification can be satisfied by a benefit data set meeting the selection criteria; and
  where said selection criteria comprises permitted transaction date information.

27. The method of claim 25,
  where said storing step further includes storing beneficiary authentication data relating to said benefit data sets and wherein said modifying step is only performed after an authentication check is implemented using said beneficiary information; and
  where said authentication data comprises a private key from a public-private encryption key set.

28. The method of claim 25, wherein said modifying step is limited to reducing values indicating the amount of benefits to be provided.

29. The method of claim 10, where at least some of said benefit data sets include different benefits corresponding to different food items.

30. The method of claim 25, wherein said storing step further comprises storing a plurality of benefit package information sets, wherein each of said benefit package information sets includes information indicating different non-monetary amounts of two items to be provided as a benefit.

31. A method of providing non-financial benefits, comprising:
   reading benefit package information from a portable information storage device, the portable information storage device including:
      a processor for executing routines used to control operation of said device; and
      a memory coupled to said processor, said memory including:
      a plurality of sets of benefit package information, each of the sets of benefit package information including: i) benefit package selection criteria data, ii) a plurality of benefit item identifiers, each benefit item identifier identifying a non-monetary item to be supplied as a benefit and iii) quantity information including a plurality of non-monetary quantity values, each non-monetary quantity value corresponding to a different benefit item identified by a benefit item identifier included in the same set of benefit package information as the corresponding non-monetary quantity value;
   an account owner interface that allows an account owner to access and modify benefit package information included in said memory, said account owner interface allowing the account owner to read benefit package information from said memory and to perform at least one of: increasing one of the non-monetary quantity values included in one of the sets of benefit package information and storing a new set of benefit package information in said memory; and
   a retailer interface, said retailer interface prohibiting a retailer from storing information on a new benefit to be provided or incrementing a stored non-momentary quantity value indicating the amount of a benefit to be provided but allowing the retailer to obtain benefit account information from said portable electronic device and to cause decrementing of non-monetary quantity values stored in said memory;
   generating a set of benefit information representing a single transaction in which non-monetary benefits are provided to a beneficiary, said set of benefit information indicating the amount and quantity of at least two non-monetary benefits which are provided to a user of said portable information storage device;
   supplying the set of benefit information representing a single transaction to said portable information storage device via said retailer interface; and
   receiving a transaction acknowledgement indicating one of: a successful transaction including debiting of the amount of benefits provided from a set of benefit information stored in said storage device and a failed transaction in which the entire transaction was rejected and no debiting of benefit information stored on said portable storage device occurs.

32. The method of claim 31, wherein said set of benefit information representing a single transaction includes information indicating quantities of at least two different types of food provided to the user of said portable information storage device.

\* \* \* \* \*